(12) United States Patent
Hua et al.

(10) Patent No.: US 11,194,425 B2
(45) Date of Patent: Dec. 7, 2021

(54) METHOD FOR RESPONDING TO TOUCH OPERATION, MOBILE TERMINAL, AND STORAGE MEDIUM

(71) Applicant: GUANGDONG OPPO MOBILE TELECOMMUNICATIONS CORP., LTD., Guangdong (CN)

(72) Inventors: Chunqiao Hua, Guangdong (CN); Guojun Sun, Guangdong (CN)

(73) Assignee: SHENZHEN HEYTAP TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 16/812,856

(22) Filed: Mar. 9, 2020

(65) Prior Publication Data

US 2020/0210047 A1  Jul. 2, 2020

Related U.S. Application Data

(63) Continuation of application No. PCT/CN2017/101285, filed on Sep. 11, 2017.

(51) Int. Cl.
*G06F 3/041* (2006.01)
*G06F 3/0488* (2013.01)

(52) U.S. Cl.
CPC ........ *G06F 3/04186* (2019.05); *G06F 3/0412* (2013.01); *G06F 3/04886* (2013.01); *G06F 2203/04104* (2013.01)

(58) Field of Classification Search
CPC ............... G06F 3/04186; G06F 3/0412; G06F 3/04886; G06F 2203/04104
See application file for complete search history.

(56) References Cited

U.S. PATENT DOCUMENTS 6,201,948 B1    3/2001  Cook et al.
9,041,663 B2 *  5/2015  Westerman ........... G06F 3/0488
                                                   345/173
9,158,401 B2 * 10/2015  Christiansson ....... G06F 3/0446
(Continued)

FOREIGN PATENT DOCUMENTS

CN    102520876 A    6/2012
CN    102681779 A    9/2012
(Continued)

OTHER PUBLICATIONS

NOA issued in corresponding U.S. Appl. No. 16/442,522 dated Jul. 30, 2020.

(Continued)

*Primary Examiner* — Chineyere D Wills-Burns
(74) *Attorney, Agent, or Firm* — Young Basile Hanlon & MacFarlane, P.C.

(57) ABSTRACT

A method for responding to a touch operation is provided, relating to the field of human-computer interaction. The method includes the following. The touch operation on a touch screen is received. Determine an operation area where the touch operation occurs, where the touch screen includes a first operation area and a second operation area, and the operation area is at least one of the first operation area and the second operation area. Determine an operation type of the touch operation. Determine whether to respond to the touch operation according to the operation area and the operation type.

10 Claims, 21 Drawing Sheets

(56) References Cited

U.S. PATENT DOCUMENTS

| | | | |
|---|---|---|---|
| 9,244,545 B2* | 1/2016 | Hinckley | G06F 3/038 |
| 9,710,101 B2* | 7/2017 | Christiansson | G06F 3/04186 |
| 9,910,521 B2* | 3/2018 | Ahn | G06F 3/04847 |
| 10,013,107 B2* | 7/2018 | Christiansson | G06F 3/04166 |
| 10,901,553 B2* | 1/2021 | Hua | G06F 3/0488 |
| 2004/0001048 A1* | 1/2004 | Kraus | G06F 3/0421 |
| | | | 345/173 |
| 2009/0191854 A1 | 7/2009 | Beason | |
| 2010/0095205 A1* | 4/2010 | Kinoshita | G06F 3/0416 |
| | | | 715/702 |
| 2010/0139990 A1* | 6/2010 | Westerman | G06F 3/03547 |
| | | | 178/18.03 |
| 2010/0225595 A1* | 9/2010 | Hodges | G06F 3/041 |
| | | | 345/173 |
| 2011/0179387 A1* | 7/2011 | Shaffer | G06F 9/542 |
| | | | 715/835 |
| 2012/0154301 A1 | 6/2012 | Kang et al. | |
| 2012/0262407 A1* | 10/2012 | Hinckley | G06F 3/038 |
| | | | 345/173 |
| 2012/0274574 A1* | 11/2012 | Aono | G06F 3/0488 |
| | | | 345/173 |
| 2013/0106725 A1 | 5/2013 | Bakken et al. | |
| 2013/0154983 A1* | 6/2013 | Christiansson | G06F 3/04166 |
| | | | 345/173 |
| 2013/0212541 A1* | 8/2013 | Dolenc | G06F 3/017 |
| | | | 715/863 |
| 2013/0249829 A1 | 9/2013 | Hitosuga | |
| 2013/0300704 A1* | 11/2013 | Takahashi | G06F 3/0488 |
| | | | 345/173 |
| 2013/0307801 A1* | 11/2013 | Nam | H04M 1/72563 |
| | | | 345/173 |
| 2013/0335333 A1 | 12/2013 | Kukulski et al. | |
| 2014/0232676 A1 | 8/2014 | Shimizu | |
| 2014/0253444 A1 | 9/2014 | Cheng et al. | |
| 2014/0292728 A1 | 10/2014 | Chihara | |
| 2015/0070302 A1 | 3/2015 | Jogo | |
| 2016/0034099 A1* | 2/2016 | Christiansson | G06F 3/0446 |
| | | | 345/174 |
| 2016/0253039 A1* | 9/2016 | Heo | G06F 3/0412 |
| | | | 345/173 |
| 2016/0364600 A1* | 12/2016 | Shah | G06K 9/00087 |
| 2017/0046038 A1* | 2/2017 | Hajas | G06F 3/04166 |
| 2017/0153764 A1 | 6/2017 | Hao et al. | |
| 2017/0277336 A1 | 9/2017 | Yang | |
| 2017/0293392 A1* | 10/2017 | Christiansson | G06F 3/04166 |
| 2017/0315720 A1 | 11/2017 | Sun | |
| 2018/0052565 A1 | 2/2018 | Zhang et al. | |
| 2018/0173338 A1 | 6/2018 | Zhang et al. | |
| 2018/0188874 A1* | 7/2018 | Cho | G01L 1/205 |
| 2018/0373389 A1 | 12/2018 | Tsai et al. | |
| 2019/0025977 A1* | 1/2019 | Christiansson | G06F 3/04883 |
| 2019/0079635 A1* | 3/2019 | Hua | G06F 3/0418 |
| 2019/0087079 A1 | 3/2019 | Wang | |
| 2019/0121457 A1 | 4/2019 | Kakinuma et al. | |
| 2019/0191042 A1 | 6/2019 | Yamaguchi et al. | |
| 2019/0391723 A1 | 12/2019 | Wang | |
| 2020/0092411 A1 | 3/2020 | Xu et al. | |
| 2020/0133479 A1 | 4/2020 | Hua et al. | |
| 2020/0142511 A1 | 5/2020 | Watanabe | |
| 2020/0201518 A1 | 6/2020 | Jung et al. | |
| 2020/0210047 A1 | 7/2020 | Hua et al. | |
| 2020/0218393 A1 | 7/2020 | Hua et al. | |

FOREIGN PATENT DOCUMENTS

| | | |
|---|---|---|
| CN | 102999198 A | 3/2013 |
| CN | 103577029 A | 2/2014 |
| CN | 103616970 A | 3/2014 |
| CN | 104169856 A | 11/2014 |
| CN | 104615303 A | 5/2015 |
| CN | 104615374 A | 5/2015 |
| CN | 104635972 A | 5/2015 |
| CN | 104679362 A | 6/2015 |
| CN | 104714691 A | 6/2015 |
| CN | 104933048 A | 9/2015 |
| CN | 105183235 A | 12/2015 |
| CN | 105245650 A | 1/2016 |
| CN | 105487809 A | 4/2016 |
| CN | 105573637 A | 5/2016 |
| CN | 105653085 A | 6/2016 |
| CN | 105786391 A | 7/2016 |
| CN | 105824559 A | 8/2016 |
| CN | 105867789 A | 8/2016 |
| CN | 105975160 A | 9/2016 |
| CN | 106095280 A | 11/2016 |
| CN | 106406904 A | 2/2017 |
| CN | 106527818 A | 3/2017 |
| CN | 106534555 A | 3/2017 |
| CN | 106598335 A | 4/2017 |
| CN | 106598455 A | 4/2017 |
| CN | 106681637 A | 5/2017 |
| CN | 106708407 A | 5/2017 |
| CN | 106775407 A | 5/2017 |
| CN | 106855782 A | 6/2017 |
| CN | 106855783 A | 6/2017 |
| CN | 106855784 A | 6/2017 |
| CN | 106951161 A | 7/2017 |
| CN | 107577415 A | 1/2018 |
| CN | 107608550 A | 1/2018 |
| CN | 107608551 A | 1/2018 |
| KR | 20050088512 A | 9/2005 |
| KR | 20160071663 A | 6/2016 |

OTHER PUBLICATIONS

ISR and English Translation issued in corresponding international application No. PCT/CN2017/101281 dated Jun. 11, 2018.
The second OA and English Translation issued in corresponding CN application No. 201710813530.1 dated Aug. 19, 2019.
Non-Final OA issued in corresponding U.S. Appl. No. 16/442,522 dated Sep. 18, 2019.
Non-Final OA issued in corresponding U.S. Appl. No. 16/124,349 dated Aug. 8, 2019.
Rejection decision and English Translation issued in corresponding CN application No. 201710813530.1 dated Dec. 2, 2019.
International search report issued in corresponding international application No. PCT/CN2017/101285 dated Jun. 11, 2018.
Extended European search report issued in corresponding European application No. 17924544.4 dated Jun. 4, 2020.
Extended European search report issued in corresponding European application No. 17924699.6 dated Jul. 7, 2020.
English translation of the first office action issued in corresponding CN application No. 201710813551.3 dated Apr. 16, 2019.
English translation of the first office action issued in corresponding CN application No. 201710830133.5 dated Sep. 26, 2018.
English translation of the Notice of allowance issued in corresponding CN application No. 201710830133.5 dated Dec. 19, 2018.
Extended European search report issued in corresponding European application No. 18193721.0 dated Feb. 12, 2019.
English translation of the International search report issued in corresponding international application No. PCT/CN2017/101269 dated May 18, 2018.
International search report issued in corresponding international application No. PCT/CN2018/104997 dated Dec. 13, 2018.
Extended European search report issued in corresponding European application No. 17924123.7 dated Jul. 6, 2020.
English translation of the first office action issued in corresponding CN application No. 201710813530.1 dated May 23, 2019.
Non-Final OA issued in corresponding U.S. Appl. No. 16/812,911 dated Oct. 29, 2020.
Non-Final OA issued in corresponding U.S. Appl. No. 16/732,212 dated Nov. 18, 2020.
India Examination Report for IN Application 201834034097 dated Feb. 3, 2021. (6 pages).

(56) References Cited

OTHER PUBLICATIONS

U.S. Final Office Action for U.S. Appl. No. 16/732,212 dated Feb. 10, 2021. (37 pages).

* cited by examiner

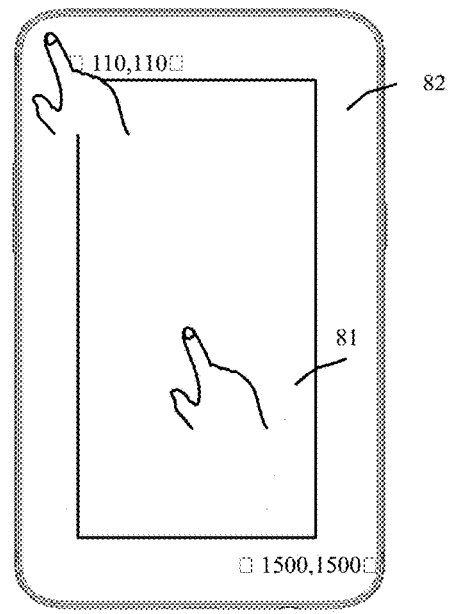

FIG. 8

| FIRST OPERATION AREA | SECOND OPERATION AREA | RESPONSE RULES |
|---|---|---|
| TOUCH OPERATION DETECTED | NO OPERATION | RESPOND TO THE TOUCH OPERATION ON THE FIRST OPERATION AREA |
| NO OPERATION | TOUCH OPERATION DETECTED | RESPOND TO THE TOUCH OPERATION ON THE SECOND OPERATION AREA |
| TOUCH OPERATION DETECTED | TOUCH OPERATION DETECTED | RESPOND TO THE TOUCH OPERATION ON THE FIRST OPERATION AREA, DO NOT RESPOND TO THE TOUCH OPERATION ON THE SECOND OPERATION AREA |

FIG. 9

| FIRST OPERATION AREA | SECOND OPERATION AREA | RESPONSE RULES |
| --- | --- | --- |
| TOUCH OPERATION IN CLICK TYPE | NO OPERATION | RESPOND TO THE TOUCH OPERATION IN CLICK TYPE ON THE FIRST OPERATION AREA |
| | TOUCH OPERATION IN CLICK TYPE | |
| | TOUCH OPERATION IN SLIDE TYPE | |
| | TOUCH OPERATION IN LONG-PRESS TYPE | |
| TOUCH OPERATION IN SLIDE TYPE | NO OPERATION | RESPOND TO THE TOUCH OPERATION IN SLIDE TYPE ON THE FIRST OPERATION AREA |
| | TOUCH OPERATION IN CLICK TYPE | |
| | TOUCH OPERATION IN SLIDE TYPE | |
| | TOUCH OPERATION IN LONG-PRESS TYPE | |
| TOUCH OPERATION IN LONG-PRESS TYPE | NO OPERATION | RESPOND TO THE TOUCH OPERATION IN LONG-PRESS TYPE ON THE FIRST OPERATION AREA |
| | TOUCH OPERATION IN CLICK TYPE | RESPOND TO THE TOUCH OPERATION ON THE SECOND OPERATION AREA |
| | TOUCH OPERATION IN SLIDE TYPE | |
| | TOUCH OPERATION IN LONG-PRESS TYPE | RESPOND TO THE TOUCH OPERATION IN LONG-PRESS TYPE ON THE FIRST OPERATION AREA |
| NO OPERATION | TOUCH OPERATION IN CLICK TYPE | RESPOND TO THE TOUCH OPERATION IN CLICK TYPE ON THE SECOND OPERATION AREA |
| | TOUCH OPERATION IN SLIDE TYPE | RESPOND TO THE TOUCH OPERATION IN SLIDE TYPE ON THE SECOND OPERATION AREA |
| | TOUCH OPERATION IN LONG-PRESS TYPE | DO NOT RESPOND TO ANY OPERATION |

FIG. 24

METHOD FOR RESPONDING TO TOUCH OPERATION, MOBILE TERMINAL, AND STORAGE MEDIUM

CROSS-REFERENCE TO RELATED APPLICATION(S)

This application is a continuation of International Application No. PCT/CN2017/101285, filed on Sep. 11, 2017, the entire disclosure of which is hereby incorporated by reference.

TECHNICAL FIELD

This disclosure relates to the field of human-computer interaction, and in particular, to a method for responding to a touch operation, mobile terminal, and storage medium.

BACKGROUND

In order to improve the utilization proportion of the touch screen of a mobile terminal, the rims of the front panel of the mobile terminal become narrower and narrower, thereby increasing the screen ratio of the mobile terminal. One way the screen ratio can be expressed is the ratio of the area of the touch screen to the area of the front panel of the mobile terminal.

For a mobile terminal with narrow rims, when a user holds the mobile terminal, the holding position may be a touch part of the touch screen, thereby causing the user to touch the edge area of the touch screen by mistake, and the mobile terminal generating a problem of misjudgment. The edge area of the touch screen refers to an area located on the upper edge, an area on the left edge, an area on the lower edge, and an area on the right edge of the touch screen.

At present, the mobile terminal is unable to determine whether the operation on the edge area of the touch screen is by mistake. If the mobile terminal directly responds to this operation, it may cause the mobile terminal to perform tasks that the user does not expect to perform, and waste the resources of the mobile terminal.

SUMMARY

According to a first aspect, a method for responding to a touch operation is provided. The method is applicable to a mobile terminal. The mobile terminal includes a touch screen. The method includes the following.

The touch operation on a touch screen is received. Determine an operation area where the touch operation occurs, where the touch screen includes a first operation area and a second operation area, and the operation area is at least one of the first operation area and the second operation area. Determine an operation type of the touch operation. Determine whether to respond to the touch operation according to the operation area and the operation type.

According to a second aspect, a mobile terminal is provided. The mobile terminal includes at least one processor and a computer readable storage. The computer readable storage is coupled to the at least one processor and stores at least one computer executable instruction thereon which, when executed by the at least one processor, causes the at least one processor to execute the method of the first aspect.

According to a third aspect, a non-transitory computer readable storage medium is provided. The non-transitory computer readable storage medium is configured to store a computer program which, when executed by a processor, causes the processor to execute the method of the first aspect.

BRIEF DESCRIPTION OF DRAWINGS

For a better understanding of the aforementioned implementations of the invention as well as additional implementations thereof, reference should be made to the Detailed Description of the implementations below, in conjunction with the following drawings in which like reference numerals refer to corresponding parts throughout the figures.

FIG. 8 is a schematic diagram illustrating a first operation area and a second operation area according to one example implementation.

FIG. 9 is a schematic diagram illustrating response rules according to one example implementation.

FIG. 24 is a schematic diagram illustrating response rules according to one example implementation.

DETAILED DESCRIPTION

To make objectives, technical solutions, and advantages of the present application more clear, implementations of the application will be described in further detail below with reference to the accompanying drawings.

First, application scenario is described.

Figure 1A:
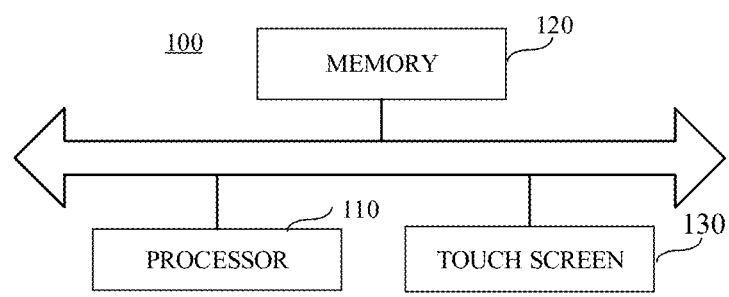
FIG. 1A to FIG. 2 are schematic structural diagrams of a mobile terminal according to one example implementation.

Referring to FIG. 1A, it shows a structural block diagram of a mobile terminal 100 according to an example implementation. The mobile terminal 100 may be a mobile phone, a tablet computer, a notebook computer, an e-book, or the like. The mobile terminal 100 in the present disclosure may include one or more of the following components: at least one processor 110 (such as a processor 110), a non-transitory computer readable storage 120 (such as a memory 120), and a touch screen 130.

The processor 110 may include one or more processing cores. The processor 110 connects various parts of the entire mobile terminal 100 by using various interfaces and lines, and executes or performs the instructions, programs, code sets, or instruction sets stored in the memory 120, and deploys the data stored in the memory 120, to execute various functions and processing data of mobile terminal 100. In an example, the processor 110 may use at least one hardware form of digital signal processing (DSP), field-programmable gate array (FPGA), and programmable logic array (PLA) to implement. The processor 110 may integrate one or a combination of a central processing unit (CPU), a graphics processing unit (GPU), and a modem. The CPU is mainly configured to handle the operating system, user interface, and application programs; the GPU is responsible for rendering and drawing the content to be displayed by the touch screen 130; and the modem is used for processing wireless communication. It can be understood that the modem may not be integrated into the processor 110, and may be implemented by a single chip.

The memory 120 may include random access memory (RAM), and may also include read-only memory (ROM). In an example, the memory 120 includes a non-transitory computer-readable storage medium. The memory 120 may be used to store instructions, programs, codes, code sets, or instruction sets. The memory 120 may include a storage program area and a storage data area, where the storage program area may store instructions for implementing an operating system, instructions for at least one function (such as a touch function, a sound playback function, an image playback function, etc.), and instructions for implementing the following method implementations; the storage data area may store data (such as audio data, phone book) created according to the use of mobile terminal 100.

Figure 1B:
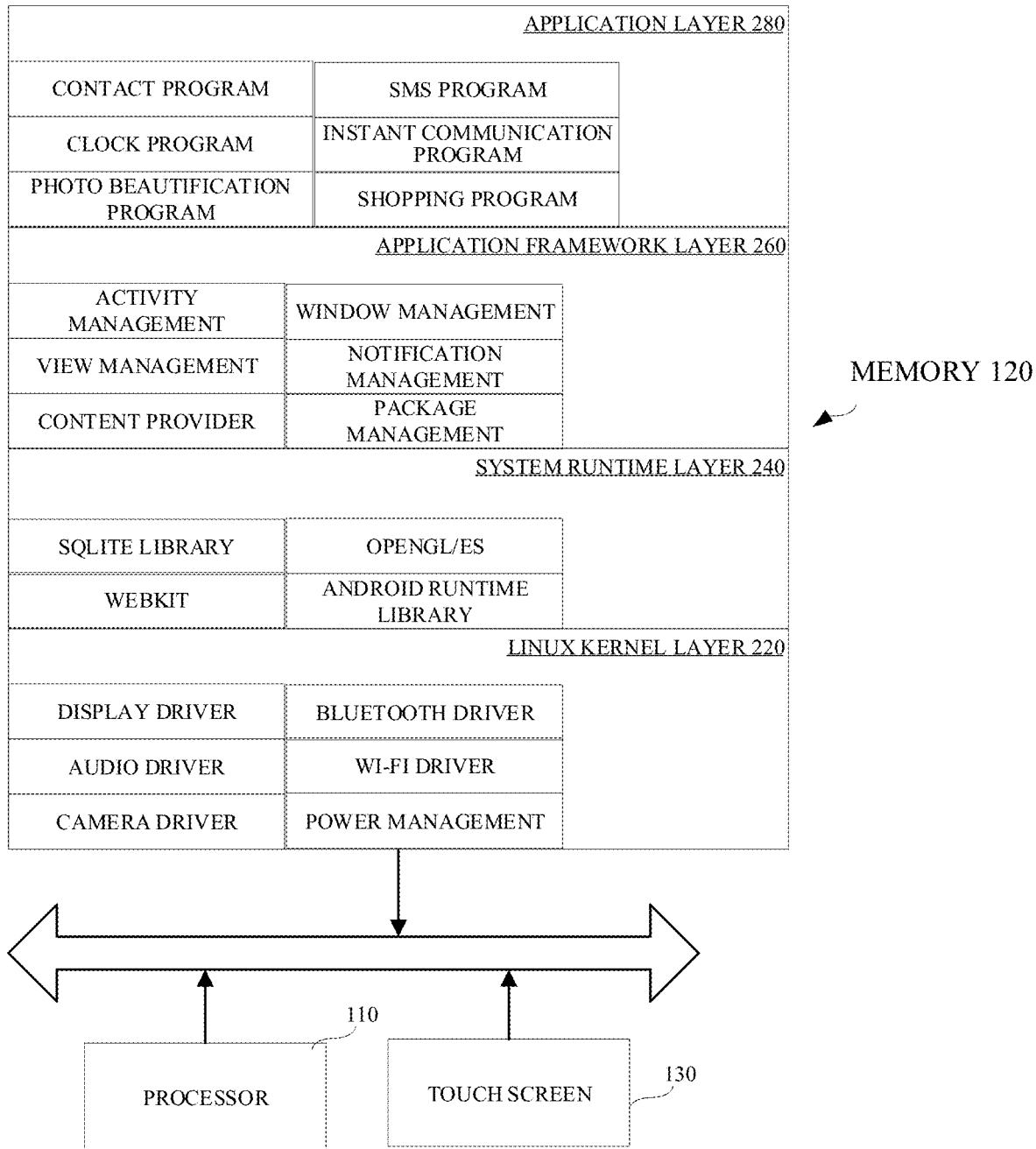

Taking the operating system of an Android system as an example, the programs and data stored in the memory 120 are illustrated in FIG. 1B. The memory 120 stores a Linux kernel layer 220, a system runtime layer 240, an application framework layer 260, and an application layer 280. The Linus kernel layer 220 provides low-level drivers for various hardware of the mobile terminal 100, such as display drivers, audio drivers, camera drivers, Bluetooth drivers, Wi-Fi drivers, power management, and so on. The system runtime layer 240 provides major feature support for the Android system through some C/C++ libraries. For example, the SQLite library provides support for database, the OpenGL/ES library provides support for 3D drawing, and the Webkit library provides support for browser kernel. The Android runtime library is also provided in the system runtime layer 240, which mainly provides some core libraries for allowing developers to write Android applications using the Java language. The application framework layer 260 provides various APIs that may be used when building application programs. Developers can also use these APIs to build their own applications, such as activity management, window management, view management, notification management, content providers, package management, call management, resource management, and location management. There is at least one application running in the application layer 280. These applications can be contact programs, SMS programs, clock programs, camera applications, etc. that are native to the operating system; they can also be applications developed by third-party developers, such as instant communication programs, photo beautification programs, etc.

Figure 2:
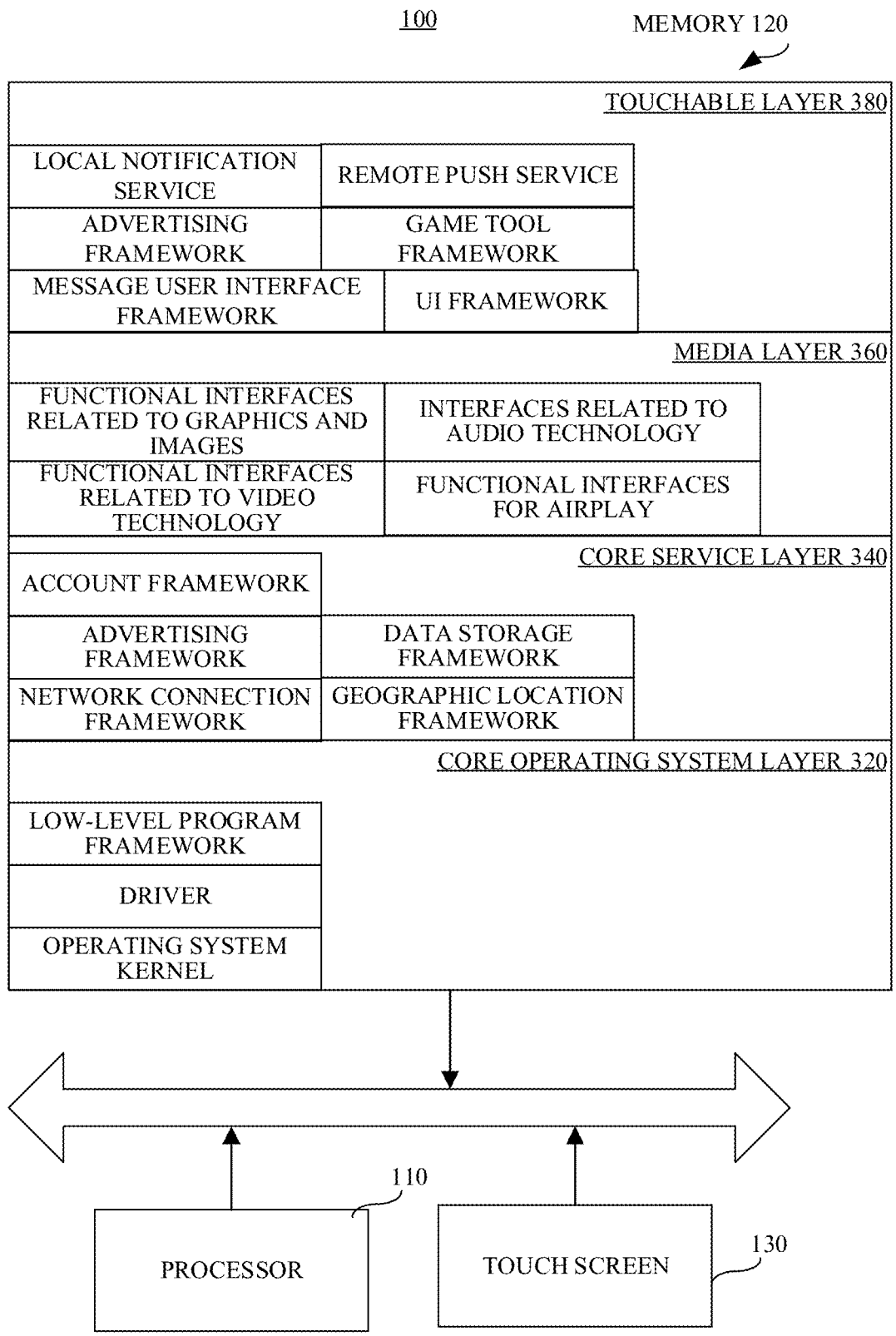

Taking the operating system of an IOS system as an example, the programs and data stored in the memory 120 are illustrated in FIG. 2. The IOS system includes: a core operating system layer 320, a core service layer 340, a media layer 360, and a touchable layer (also called Cocoa touch layer) 380. The core operating system layer 320 includes an operating system kernel, drivers, and low-level program frameworks. These low-level program frameworks provide functions closer to the hardware for use by the program framework located at the core service layer 340. The core service layer 340 provides system services and/or program frameworks required by the application program, such as a foundation framework, an account framework, an advertising framework, a data storage framework, a network connection framework, a geographic location framework, a motion framework, and so on. The media layer 360 provides audio-visual-related interfaces for applications, such as interfaces related to graphics and images, interfaces related to audio technology, interfaces related to video technology, and AirPlay interfaces for audio and video transmission technologies. The touchable layer 380 provides various commonly-used interface-related frameworks for application development. The touchable layer 380 is responsible for user touch interactive operations on the mobile terminal 100. For example, a local notification service, a remote push service, an advertising framework, a game tool framework, a message user interface (UI) framework, a user interface UIKit framework, a map framework, and so on.

Among the frameworks illustrated in FIG. 2, frameworks related to most applications include, but are not limited to: a basic framework in the core service layer 340 and a UIKit framework in the touchable layer 380. The basic framework provides many basic object classes and data types, and provides the most basic system services for all applications, regardless of the UI. The classes provided by the UIKit framework are basic UI class libraries for creating touch-based user interfaces. IOS applications can provide UI based on the UIKit framework, so it provides the application's infrastructure for building user interfaces, drawing, handling and user interaction events, responding to gestures, and more.

The touch screen 130 is used for receiving a touch operation by a user using a finger, a touch pen, or any suitable object on or nearby, and a user interface displaying various applications. The touch screen 130 is usually disposed on the front panel of the mobile terminal 100. The touch screen 130 may be designed as a full screen, a curved screen, or a special-shaped screen. The touch screen 130 can also be designed as a combination of a full screen and a curved screen, and a combination of a special-shaped screen and a curved screen, which is not limited in this example.

Full Screen

Figure 3A:
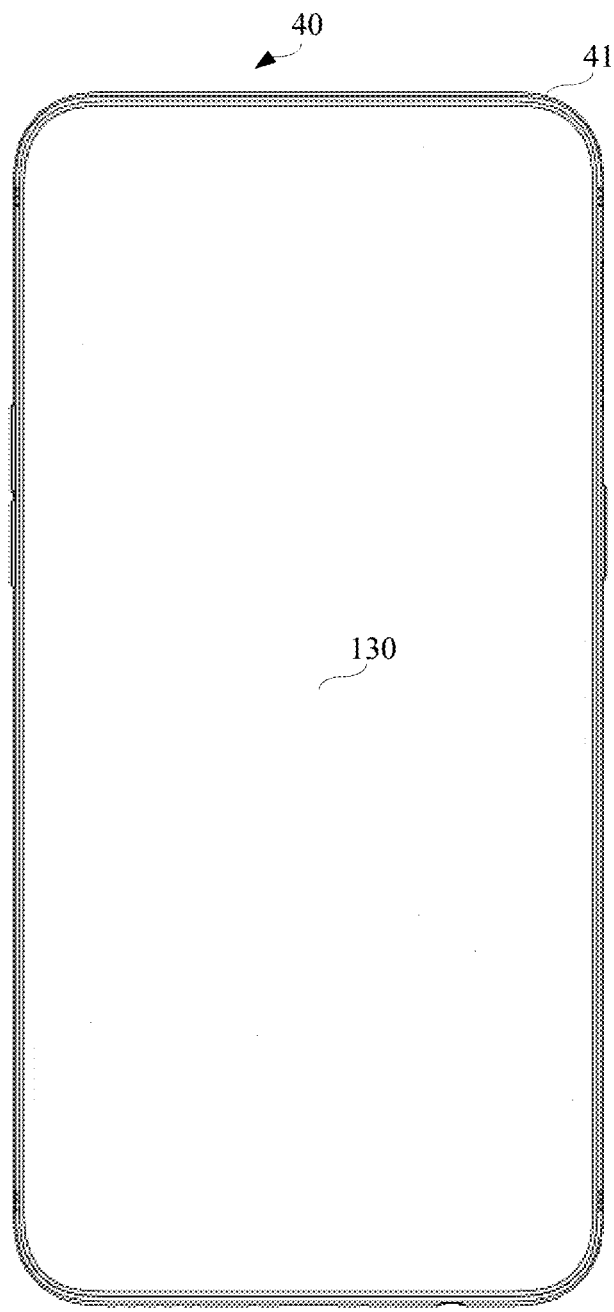
FIG. 3A to FIG. 3F are schematic diagrams illustrating a mobile terminal according to one example implementation.

The full screen may refer to a screen design in which the touch screen 130 occupies the front panel of the mobile terminal 100 with a screen ratio exceeding a threshold (such as 80% or 90% or 95%). One calculation method of the screen ratio is:the area of the touch screen 130/the area of the front panel of the mobile terminal 100*100%; another way to calculate the screen ratio is:the diagonal of touch screen 130/the diagonal of the front panel of the terminal 100*100%. In the schematic example illustrated in FIG. 3A, almost all areas on the front panel of the mobile terminal 100 are touch screen 130. On the front panel 40 of the mobile terminal 100, all areas other than the edges generated by the middle frame 41 are all touch screen 130. The four corners of the touch screen 130 may be right-angled or rounded.

The full screen may also be a screen design in which at least one front panel component is integrated inside or below the touch screen 130. In an example, the at least one front panel component includes a camera, a fingerprint sensor, a proximity light sensor, a distance sensor, and the like. In some examples, other components on the front panel of the related mobile terminal are integrated in all or part of the touch screen 130. For example, after the photosensitive element in the camera is split into multiple photosensitive pixels, the pixels are integrated in a black area in each display pixel in the touch screen 130. Since the at least one front panel component is integrated inside the touch screen 130, the full screen has a higher screen ratio.

In other examples, the front panel components on the front panel of the related mobile terminal can also be set on the side or back of the mobile terminal 100, such as placing an ultrasonic fingerprint sensor under the touch screen 130, or a bone-conducting earpiece inside the mobile terminal 100, and the camera arranged on the side of the mobile terminal in a pluggable structure.

In some examples, when the mobile terminal 100 uses a full screen, a single side, or two sides (such as left and right sides), or four sides (such as top, bottom, left, and right sides) of the middle frame of the mobile terminal 100 are provided with edge touch sensors 120. The edge touch sensors 120 are used to detect at least one of a user's touch operation, click operation, press operation, and slide operation on the middle frame. The edge touch sensor 120 may be any one of a touch sensor, a thermal sensor, and a pressure sensor. The user can apply operations on the edge touch sensor 120 to control applications in the mobile terminal 100.

Curved Screen

Figure 3B:
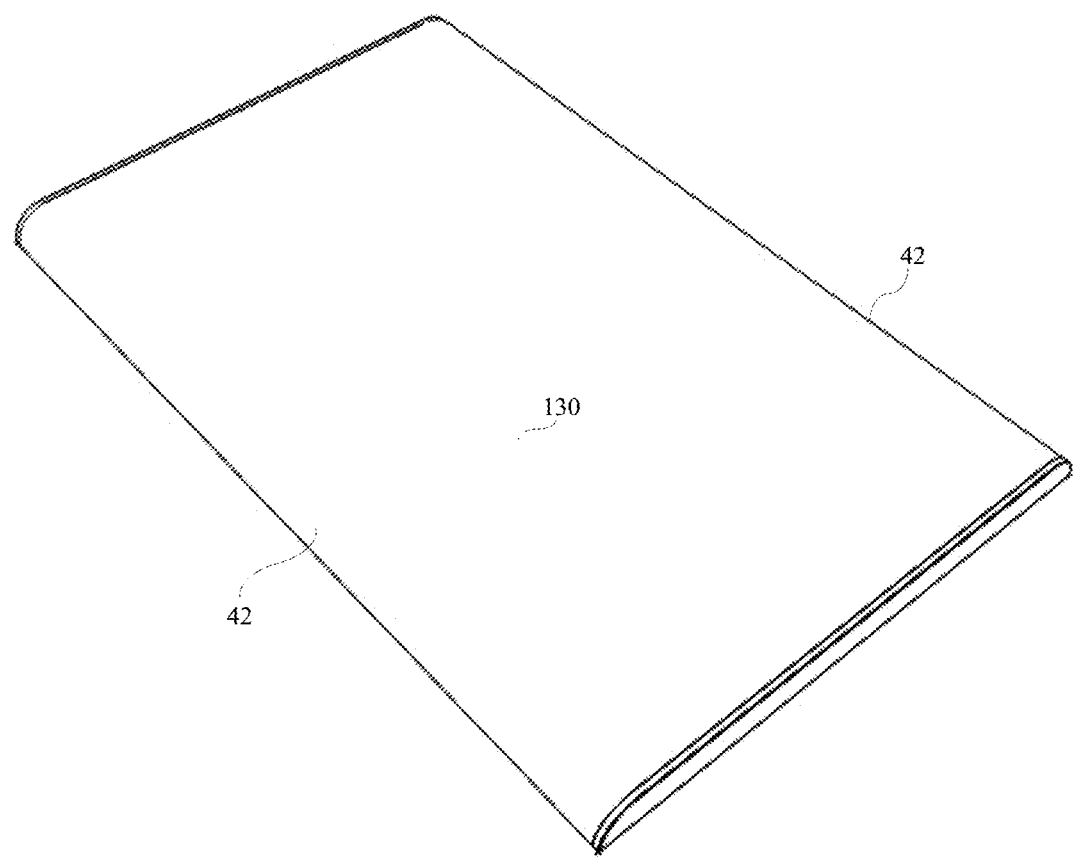

The curved screen refers to a screen design in which the screen area of the touch screen 130 is not in a plane. Generally, a curved screen has at least one cross section: the cross section has a curved shape, and the projection of the curved screen in any plane direction perpendicular to the cross section is a flat screen design. The curved shape may be U-shaped. In an example, the curved screen refers to a screen design manner in which at least one side is a curved shape. In an example, the curved screen refers to that at least one side of the touch screen 130 extends to cover the middle frame of the mobile terminal 100. Since the side of the touch screen 130 extends to cover the middle frame of the mobile terminal 100, the middle frame without the display function and the touch function is also covered as a displayable area and/or an operable area, so that the curved screen has a higher screen ratio. In an example, in the example illustrated in FIG. 3B, the curved screen refers to a screen design in which the left and right sides 42 are curved; or, the curved screen refers to a screen design in which the upper and lower sides are curved; or, curved screen refers to a screen design with four curved sides on the top, bottom, left, and right. In another example, the curved screen is made of a touch screen material with a certain flexibility.

Special-Shaped Screen

The special-shaped screen is a touch screen with an irregular shape. The irregular shape is not a rectangle or a rounded rectangle. In an example, the special-shaped screen refers to a screen design provided with protrusions, notches, and/or holes on the rectangular or rounded rectangular touch screen 130. In an example, the protrusion, the notch, and/or the hole can be located at the edge of the touch screen 130, the center of the screen, or both. When the protrusion, notch, and/or hole are set on one edge, they can be set at the middle position or both ends of the edge; when the protrusion, notch, and/or hole are set on the center of the screen, they can be set in one or more of the areas: the upper area, the upper left area, the left area, the lower left area, the lower area, the lower right area, the right area, and the upper right area of the screen. When arranged in multiple areas, the protrusions, the notches, and the holes can be distributed in a centralized or distributed manner; they can be distributed symmetrically or asymmetrically. The number of the protrusions, the notches, and/or the holes is not limited.

Because the special-shaped screen covers the upper and/or lower forehead area of the touch screen as a displayable area and/or an operable area, so that the touch-screen display takes up more space on the front panel of the mobile terminal, having a larger screen ratio. In some examples, the notches and/or holes are used to receive at least one front panel component, which includes at least one of a camera, a fingerprint sensor, a proximity light sensor, a distance sensor, handset, an ambient light sensor, or physical buttons.

Figure 3C:
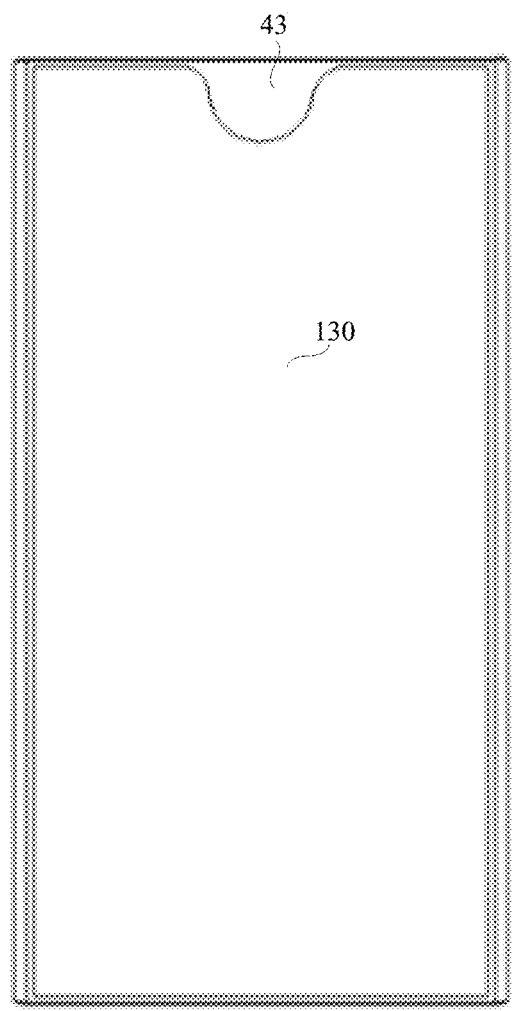
Figure 3D:
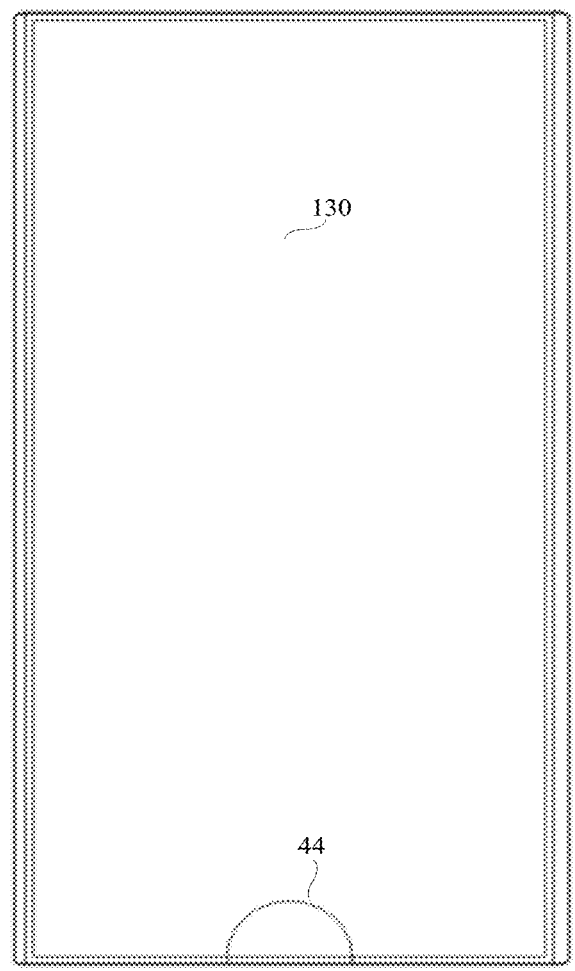
Figure 3E:
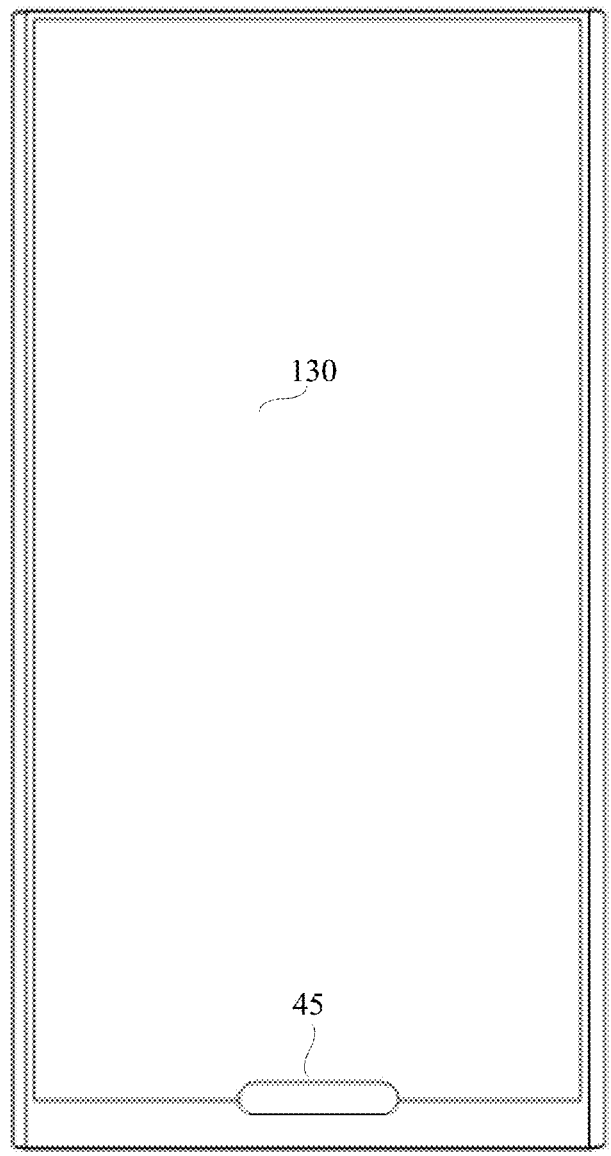
Figure 3F:
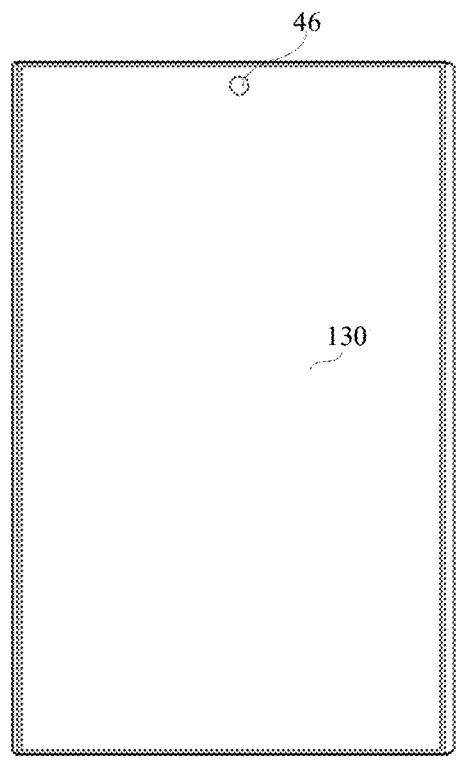

Schematically, the notch may be provided on one or more edges, and the notch may be a semi-circular notch, a right-angled rectangular notch, a rounded rectangular notch, or an irregularly-shaped notch. In the example illustrated schematically in FIG. 3C, the special-shaped screen may be a screen design provided with a semi-circular notch 43 at the center of the upper edge of the touch screen 130. The space vacated by the semi-circular notch 43 is used for accommodating at least one front panel component of a camera, a distance sensor (also known as a proximity sensor), a handset, and an ambient light brightness sensor. As illustrated in FIG. 3D, the special-shaped screen may be designed that a semi-circular notch 44 is located on the central position of the lower edge of the touch screen 130. The space vacated by the semi-circular notch 44 is used to accommodate at least one component of a physical button, a fingerprint sensor, and a microphone. As illustrated in the example of FIG. 3E, the special-shaped screen may be a screen design provided with a semi-elliptical notch 45 in the center of the lower edge of the touch screen 130. A semi-elliptical notch is formed on the front panel of the mobile terminal 100, and two semi-elliptical notches surround to form an elliptical area. The elliptical area is used to accommodate physical keys or fingerprint identification modules. In the example illustrated in FIG. 3F, the shaped screen can be a screen design having at least one small hole 45 in the upper half of the touch screen 130, and the space vacated by the small hole 45 is used to accommodate at least one front panel component of a camera, a distance sensor, a handset, and an ambient light sensor.

In addition, those skilled in the art can understand that the structure of the mobile terminal 100 illustrated in the above figures does not constitute a limitation on the mobile terminal 100. The mobile terminal may include more or fewer components than illustrated in the drawings, or combine certain components, or different component arrangements. For example, the mobile terminal 100 further includes components such as a radio frequency circuit, an input unit, a sensor, an audio circuit, a WIFI module, a power supply, and a Bluetooth module, and details are not described herein again.

Some terms of the present disclosure are described.

Touch operation of a click type: refers to a touch operation where the touch position on the touch screen is fixed within a first touch duration. The first touch duration is usually shorter, for example: 500 ms.

In an example, the touch operation of the click type is a click operation, a double-click operation, or the like.

Figure 4:
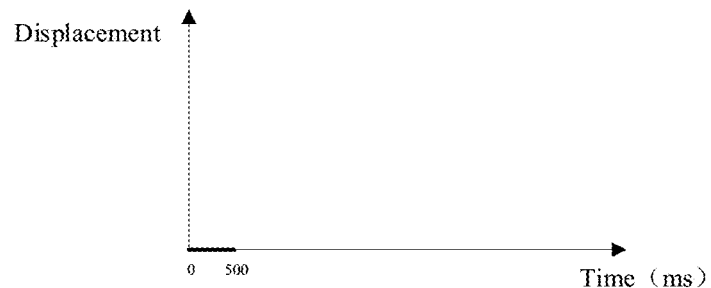
FIG. 4 is a schematic diagram illustrating a touch position and displacement according to one example implementation.

Referring to FIG. 4, the relationship between the time and displacement of the touch operation of the click type is illustrated. It can be known from FIG. 4 that within 500 ms, the touch position of the touch operation does not change, and the displacement is 0 (indicated by a bold line in FIG. 1).

In this example, the touch operation of the click type have a short displacement within a first sub-duration of the first touch duration, and a fixed displacement within a second sub-duration, and a ratio of the first sub-duration to the first touch duration is smaller than a first ratio, i.e., the touch operation of the click type is a touch operation based on click.

The first ratio is a value greater than 0 and less than 1, such as 0.5, 0.3, or 0.1. This example does not limit the value of the first ratio.

Touch operation of a slide type: refers to a touch operation where the touch position on the touch screen is not fixed within a second touch duration. The second touch duration is greater than the first touch duration, for example: 1 second.

Figure 5:
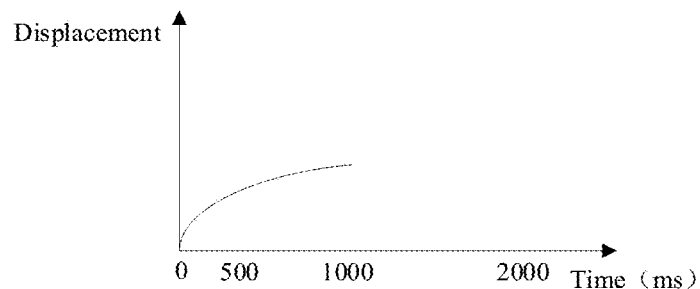
FIG. 5 is a schematic diagram illustrating a touch position and displacement according to one example implementation.

Referring to FIG. 5, the relationship between the time and the touch position of the touch operation of the slide type is illustrated. It can be known from FIG. 5 that, within 1 second, the touch position of the touch operation is not fixed and the displacement changes.

In this example, the touch operation of the slide type may have a change in displacement in a third sub-duration of the second touch duration, and the displacement in a fourth sub-duration is fixed. A ratio of the fourth sub-duration to the second touch duration is smaller than a second ratio, i.e., the touch operation of the slide type is a slide-based touch operation.

The second ratio is a value greater than 0 and less than 1, such as 0.5, 0.3, or 0.1. The second ratio may be equal to or different from the first ratio. This example does not limit the value of the second ratio.

Touch operation of a long-press type: refers to a touch operation where the touch position on the touch screen is fixed during a third touch duration. The third touch duration is greater than first touch duration, for example: 2 s.

Figure 6:
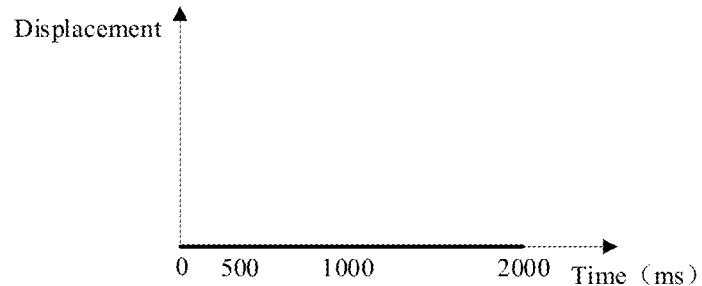
FIG. 6 is a schematic diagram illustrating a touch position and displacement according to one example implementation.

Referring to FIG. 6, the relationship between the time and touch position of the touch operation of the long-press type is illustrated. It can be known from FIG. 6 that within 2 seconds, the touch position of the touch operation is fixed and the displacement is 0.

In this example, the touch operation of the long-press type may have a change in displacement within a fifth sub-duration of the third touch duration, and a displacement within a sixth sub-duration is fixed. A ratio of the fifth sub-duration to the third touch duration is smaller than a third ratio, i.e., the touch operation of the long-press type is a touch operation based on long-press.

The third ratio is a value greater than 0 and less than 1, such as 0.5, 0.3, or 0.1. The third ratio may be the same as the first ratio or may be different from the first ratio. This example does not limit the value of the third ratio.

Operation area: an area in the touch screen that supports responding to the received touch operation. In an example, all areas on the touch screen of the mobile terminal are operation areas.

When the rims of the touch screen are narrow, during use, the palm and/or fingers of the user may accidentally touch the edge area of the touch screen, resulting in operations by mistake. Based on this technical problem, the present disclosure provides the following technical solutions to identify operations by mistake by users (i.e., accidental operations of users) and save resources of the mobile terminal.

The present disclosure uses the mobile terminal as an example for description. The touch screen of the mobile terminal is any one of the above-mentioned full screen, curved screen, and special-shaped screen, or it may be other types of touch screen. In an example, the width of the rims of the touch screen of the mobile terminal is smaller than a preset threshold, for example, the width of the rims of the curved screen is 0.

Figure 7:
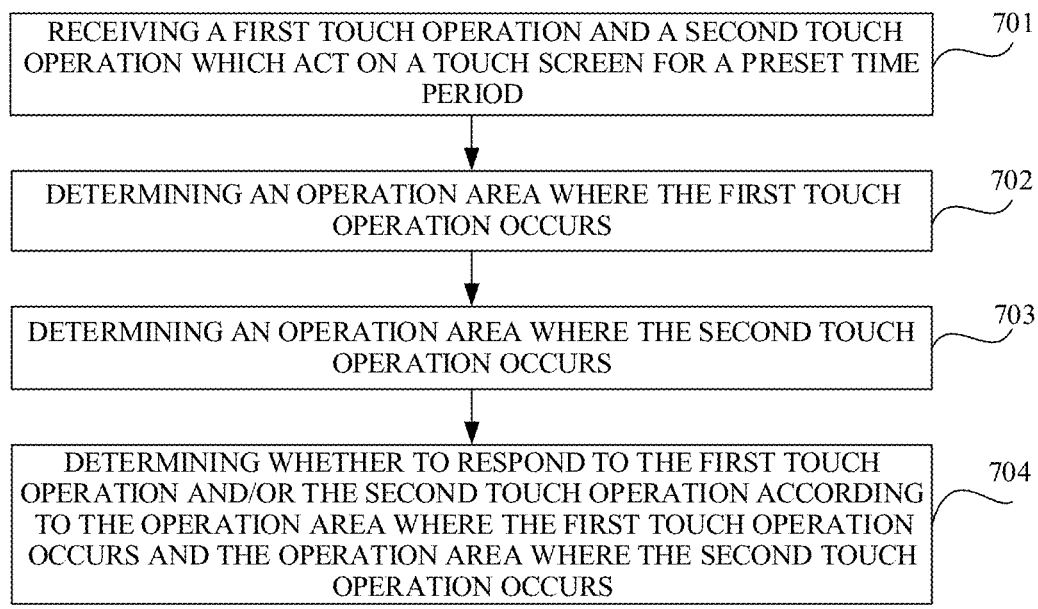
FIG. 7 is a schematic flowchart of a method for responding to a touch operation according to one example implementation.

Referring to FIG. 7, a flowchart of a method for responding to a touch operation in accordance with an example implementation is provided. The method begins at 701.

At 701: receiving a first touch operation and a second touch operation which act on a touch screen for a preset time period.

In an example, a touch sensor is provided in the touch screen of the mobile terminal, and the touch sensor detects whether there is a touch operation in real time or periodically. When the touch sensor detects a touch operation, a touch event corresponding to the touch operation is sent to the processor. The processor recognizes the operation type and/or the touch position of the touch operation according to the touch event.

The operation type of the touch operation may be at least one of a click type, a slide type, and a long-press type.

The preset time period is usually short, for example: 100 ms, i.e., it can be considered that the mobile terminal receives both the first touch operation and the second touch operation at the same time.

In this example, the first touch operation and the second touch operation are used to indicate different touch operations, and do not represent the number and/or the receiving order of the touch operations. For example, the mobile terminal receives three counts of touch operations on the touch screen. The first count of touch operation is the first touch operation, and the second count of touch operation or the third count of touch operation is the second touch operation.

At 702: determining an operation area where the first touch operation occurs.

The touch screen includes a first operation area and a second operation area. The operation area where the first touch operation occurs is one of the first operation area and the second operation area.

In the present disclosure, the mobile terminal determines the operation area on which the touch operation acts (including the first touch operation and the second touch operation), including: detecting whether the touch position of the touch operation belongs to a position range corresponding to the first operation area; if the touch position of the touch operation belongs to the position range corresponding to the first operation area, then determine that the operation area on which the touch operation acts is the first operation area; if the touch position of the touch operation does not belong to the position range corresponding to the first operation area, then determine that the operation area on which the touch operation acts is the second operation area.

The mobile terminal also determines whether the touch position of the touch operation belongs to a position range corresponding to the second operation area. If the touch position of the touch operation belongs to the position range corresponding to the second operation area, then determine that the operation area on which the touch operation acts is the second operation area; if the touch position of the touch operation does not belong to the position range corresponding to the second operation area, then determine that the operation area on which the touch operation acts is the first operation area.

The position range of the first operation area is a coordinate set composed of at least one coordinate. Schematically, the position range of the first operation area is {(100, 100), (1500, 1500)}, indicating that a range from position (100, 100) to position (1500, 1500) belongs to the first operation area.

The position range of the second operation area is determined according to the position range of the first operation area, i.e., the position range of the second operation area is an operation area other than the first operation area.

The coordinate of each position is determined according to the positions of pixel points. For example: position (100, 100) represents the pixel point of the 100th row and the 100th column.

Referring to FIG. 8, the touch screen is divided into a first operation area 81 and a second operation area 82. The position range of the first operation area 81 is {(110, 110), (1500, 1500)}, and the position range of the second operation area is the operation area other than first operation area 81 in the touch screen. If there are two touch operations on the touch screen. The touch position of the first touch operation is (900, 900), which belongs to the position range of the first operation area 81, and the touch position of the second touch operation is (20, 20), which does not belong to the position range of the first operation area 81, then it is determined that the operation area to which the first touch operation is applied is the first operation area, and the operation area to which the second touch operation is applied is the second operation area.

In this example, the touch position of the touch operation is represented by only one coordinate as an example. In actual implementations, the touch position of the touch operation may also be represented by a coordinate set, and in this case the mobile terminal, according to the coordinate set, calculates the average of the x-axis and y-axis respectively to obtain an average coordinate; determines the operation area on which the touch operation acts based on the average coordinate.

For example: the touch positions of a touch operation are {(900, 900), (900, 901), (900, 902), (901, 900), (901, 901), (901, 902), (902, 900), (902, 901), (902, 902)}, then the average value of the x-axis is (900+900+900+901+901+901+901+902+902+902)/9=901; the average value of the y-axis is (900+900+900+901+901+901+901+902+902+902)/9=901; then the average coordinate is (901, 901), which belongs to the position range of the first operation area, and it is determined that the operation area on which the touch operation acts is the first operation area.

When the position of the touch operation is represented by a coordinate set, if in the coordinate set, all the coordinates or coordinates exceeding a predetermined proportion belong to the same operation area, it is determined that the position on which the touch operation acts belongs to this operation area.

At 703: determining an operation area where the second touch operation occurs.

The operation area where the second touch operation occurs is one of the first operation area and the second operation area.

For a detailed description of 703, please refer to 702, which is not described in this example.

At 704: determining whether to respond to the first touch operation and/or the second touch operation according to the operation area where the first touch operation occurs and the operation area where the second touch operation occurs.

Response rules corresponding to the operation areas are preset in the mobile terminal. The response rules are indicative of whether to respond to touch operations on the first operation area and the second operation area. The mobile terminal determines whether to respond to the first touch operation and/or the second touch operation according to the response rules corresponding to the operation area operated by the first touch operation and the operation area operated by the second touch operation.

Referring to FIG. 9, response rules corresponding to the operation areas are provided. When the first touch operation acts on the first operation area and the second touch operation acts on the second operation area, the mobile terminal responds to the first touch operation and does not respond to the second touch operation.

In an example, a response priority corresponding to an operation area is preset in the mobile terminal. A response priority of a touch operation on the first operation area is higher than a response priority of a touch operation on the second operation area. The mobile terminal determines whether to respond to the first touch operation and/or the second touch operation according to a response priority corresponding to the operation area where the first touch operation occurs and a response priority corresponding to the operation area where the second touch operation occurs.

In an example, the operation area of the first touch operation is the first operation area, and the operation area of the second touch operation is the second operation area. Since the response priority corresponding to the first operation area is higher than the response priority corresponding to the second operation area, the mobile terminal responds to the first touch operation, and does not respond to the second touch operation; or, the mobile terminal responds to the first touch operation, and after responding to the first touch operation, responds to the second touch operation.

The response priority corresponding to the first operation area refers to the response priority of the touch operation on the first operation area; the response priority corresponding to the second operation area refers to the response priority of the touch operation on the second operation area.

According to the method provided in this example, when the mobile terminal receives at least two touch operations, the mobile terminal determines whether to respond to the touch operation according to the operation area where each touch operation occurs, solving the problem of wasting the operating resources of the mobile terminal caused by the mobile terminal upon reception of a touch operation responding directly to the touch operation and the touch operation being an accidental operation. The mobile terminal can determine, based on whether the operation area is an area where accidental operations occur with a high probability, whether to respond to the touch operation, thereby reducing the probability of the mobile terminal responding to accidental operations.

In the present disclosure, the mobile terminal responding to a touch operation (including the first touch operation and/or the second touch operation) refers to performing a task indicated by the touch operation. For example: a touch operation is a click operation that clicks on an application icon on the desktop, then the mobile terminal responds to the touch operation by running the application in the foreground. Another example: a touch operation is a long-press operation on a voice input option. The mobile terminal responds to the touch operation by starting the audio recording function. For another example: if the touch operation is a sliding operation on the contact's display page, the mobile terminal responds to the touch operation by scrolling the contacts page to show more contacts according to the sliding distance and the sliding orientation of the sliding operation. The mobile terminal can perform other tasks when responding to the touch operation, which will not be listed one by one herein.

In the foregoing examples, because the edge area of the touch screen is generally an area where accidental operations occur with a high probability, the second operation area is located at the edge area of the touch screen. The touch screen includes four edge areas: an upper edge area, a lower edge area, a left edge area, and a right edge area; the second operation area includes at least one of the four edge areas; the first operation area is an area other than the second operation area in the touch screen.

Referring to FIG. 8, the second operation area 82 includes four edge areas, and the first operation area 81 is the area other than the second operation area 82 in the touch screen.

The shape of the first operation area may be rectangular, rounded rectangle, circle, ellipse, irregular shape, etc. Accordingly, the shape of the second operation area is determined according to the shape of the first operation area.

Figure 10:
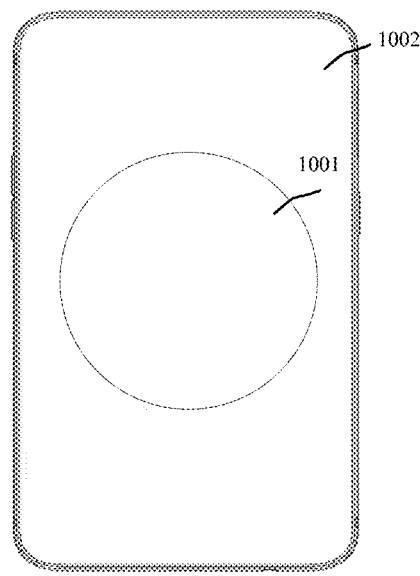
FIG. 10 is a schematic diagram illustrating a first operation area and a second operation area according to one example implementation.

Referring to FIG. 10, the shape of the first operation area 1001 is circular, and areas other than the first operation area 1001 in the touch screen are all second operation area 1002.

The shape of the first operation area and/or the second operation area is set by the mobile terminal by default; or, the shape is selected by the user, which is not limited herein.

The size of the first operation area and/or the second operation area is set by the mobile terminal by default; or the size is selected by the user, which is not limited herein.

In this example, by setting the edge areas with a higher probability of touching by mistake as the second operation area, and setting the areas other than the second operation area as the first operation area, since the response priority corresponding to the first operation area is higher than the response priority corresponding to the second operation area, when the mobile terminal receives touch operations on the first operation area and second operation area respectively, it can respond preferentially to touch operations on the first operation area, thereby reducing the probability of the mobile terminal preferentially responding to accidental operations.

Depending on different ways the user uses the mobile terminal, the area where an accidental touch operation acts in the touch screen may be different. For example: when the user uses a right hand for holding the mobile terminal, the probability of accidentally touching the right edge area of the touch screen is greater. In this case, if the position and/or size of the first operation area and the second operation area in the touch screen are fixed, and the second operation area includes fewer right edge area, or even does not include the right edge area, the mobile terminal may still respond to accidental operations. In order to reduce the probability of the mobile terminal responding to accidental operations, in this present disclosure, the mobile terminal also determines the first operation area and second operation area in the touch screen in advance according to the current usage situation.

The usage situation of the mobile terminal includes, but is not limited to, at least one of a holding mode corresponding to the mobile terminal, a display mode of the mobile terminal, and an implementation scenario of the mobile terminal.

The holding mode corresponding to the mobile terminal refers to the way the user holds the mobile terminal. The holding mode includes: right-hand holding, left-hand holding, and two-hand holding.

The display mode of mobile terminal includes horizontal screen display and vertical screen display.

Figure 11:
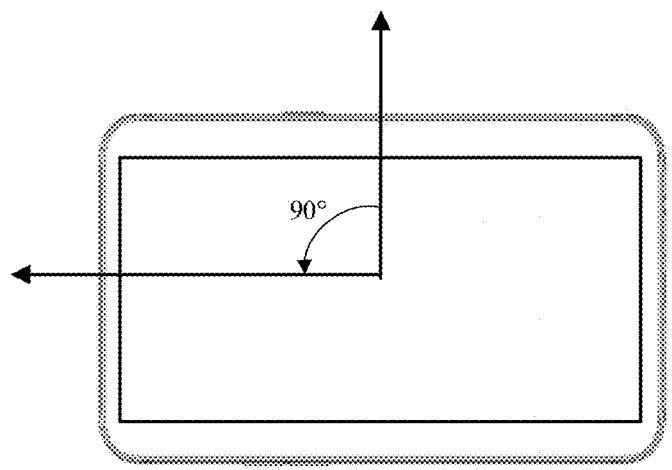
FIG. 11 is a schematic diagram illustrating a display mode according to one example implementation.
Figure 12:
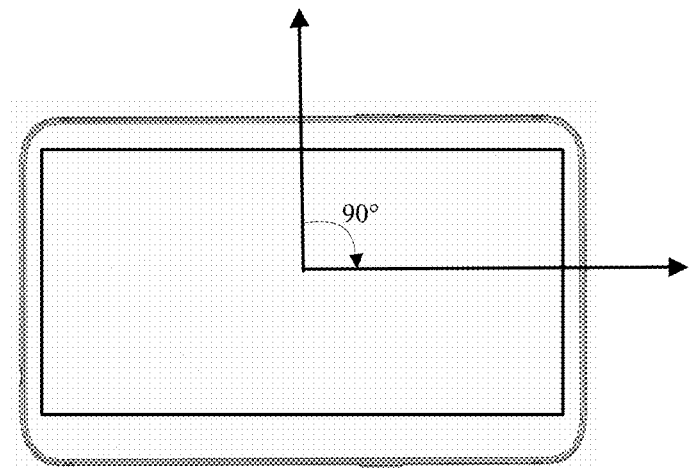
FIG. 12 is a schematic diagram illustrating a display mode according to one example implementation.

Horizontal screen display refers to a display mode where the display interface of the mobile terminal is rotated 90 degrees to the left or right with the center point as the axis. In the present disclosure, the display mode in which the display interface is rotated 90 degrees to the left with the center point as the axis is referred to as a positive horizontal screen display. Referring to FIG. 11, the display interface is rotated 90 degrees to the left with the center point as the axis; the display mode in which the display interface is rotated 90 degrees to the right with the center point as the axis is referred to as an inverted horizontal screen display. Referring to FIG. 12, the display interface is rotated 90 degrees to the right with the center point as the axis.

The present disclosure merely illustrates an example, i.e., a display mode in which the display interface is rotated 90 degrees to the left with the center point as the axis is a positive horizontal screen display and a display mode in which the display interface is rotated 90 degrees to the right with the center point as the axis is an inverted horizontal screen display. In actual implementations, a display mode in which the display interface is rotated 90 degrees to the left with the center point as the axis may be implemented as an inverted horizontal screen display, and a display mode in which the display interface is rotated 90 degrees to the right with the center point as the axis may be implemented as a positive horizontal screen display, which is not limited herein.

Figure 13:
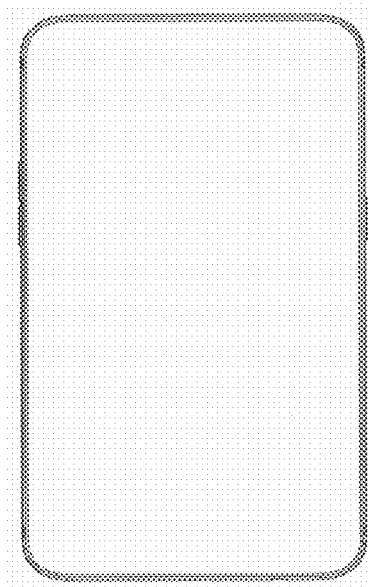
FIG. 13 is a schematic diagram illustrating a display mode according to one example implementation.
Figure 14:
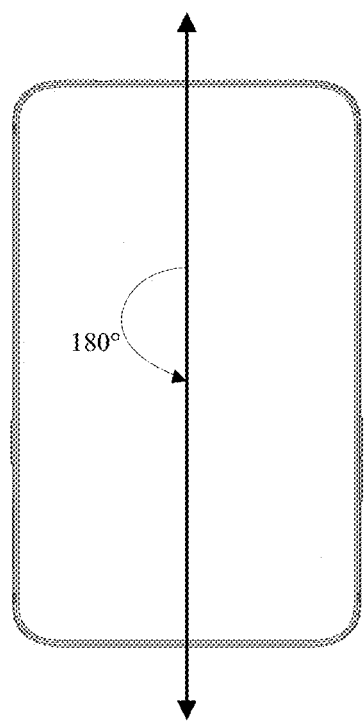
FIG. 14 is a schematic diagram illustrating a display mode according to one example implementation.

Vertical screen display refers to a display mode in which the display interface of the mobile terminal is not rotated, or is rotated 180 degrees with the center point as the axis. In this present disclosure, the display mode in which the display interface does not rotate is referred to as a positive vertical screen display. Referring to FIG. 13, the display interface is not rotated. The display mode in which the display interface is rotated 180 degrees with the center point as the axis is referred to as an inverted vertical screen display. Referring to FIG. 14, the display interface is rotated 180 degrees with the center point as the axis.

The present disclosure merely illustrates an example, i.e., the display mode in which the display interface does not rotate is positive vertical screen display and the display mode in which the display interface is rotated by 180 degrees with the center point as the axis is an inverted vertical screen display. In actual implementations, the display mode in which the display interface does not rotate may be implemented as the inverted vertical screen display, and the display mode in which the display interface is rotated by 180 degrees with the center point as the axis is the positive vertical screen display, which is not limited in the present disclosure.

The implementation scenario of the mobile terminal includes applications currently running on the mobile terminal.

Figure 15:
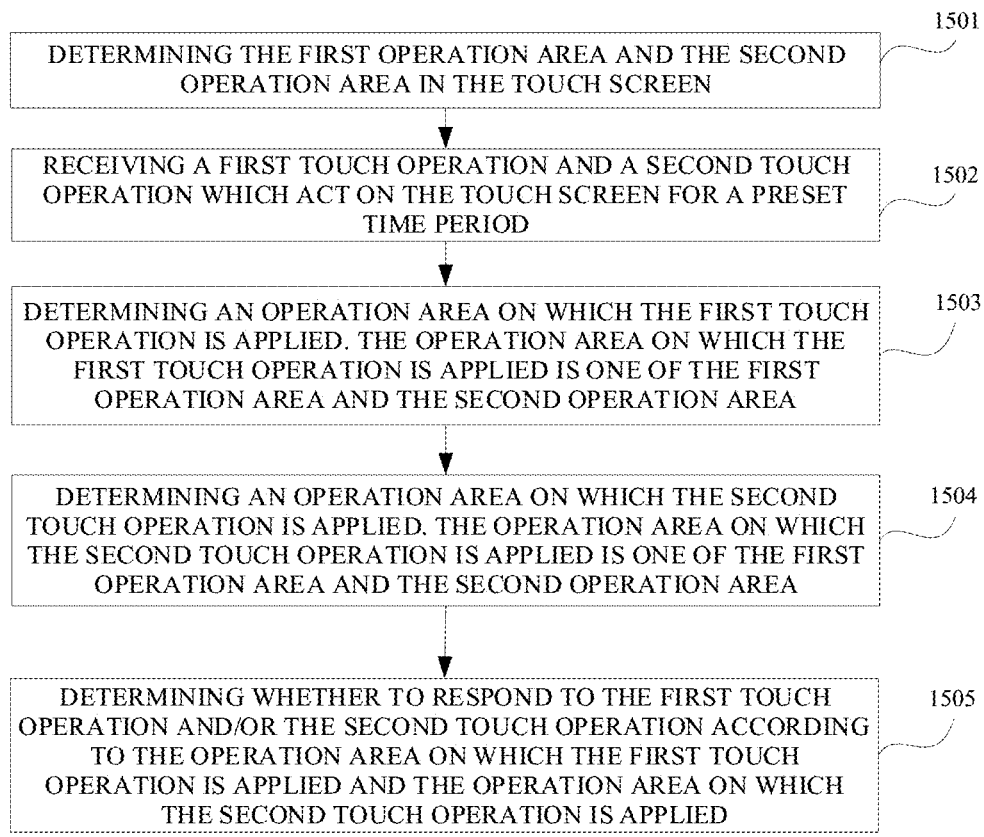
FIG. 15 is a schematic flowchart of a method for responding to a touch operation according to one example implementation.

FIG. 15 is a flowchart illustrating a method for responding to a touch operation according to another example implementation. The method begins at 1501.

At 1501: determining the first operation area and the second operation area in the touch screen.

The manner in which the mobile terminal determines the first operation area and second operation area in the touch screen includes but is not limited to the following.

First manner: determining the holding mode corresponding to the mobile terminal; determining the first operation area and second operation area according to the holding mode.

The ways in which the mobile terminal determines the holding mode of the mobile terminal includes but is not limited to the following.

First way: the mobile terminal determines the holding mode based on the received fingerprint information of the touch operation.

The mobile terminal has pre-stored template information of the left-hand fingers and template information of the right-hand fingers. A fingerprint sensor is provided in the touch screen of the mobile terminal, and the fingerprint sensor is used to collect fingerprint information of a touch operation on the touch screen. When the mobile terminal receives a touch operation, it collects the fingerprint information of the touch operation through the fingerprint sensor and matches the fingerprint information with the template information. If the fingerprint information collected N times each matches the template information of the left-hand fingers, it is determined that the holding mode is left-hand holding. If the fingerprint information collected N times each matches the template information of the right-hand fingers, then it is determined that the holding mode is right-hand holding; if the fingerprint information collected N times each matches the template information of the left-hand fingers, while also matches the template information of the right-hand fingers, it is determined that the holding mode is two-hand holding.

Second way: the mobile terminal determines the holding mode according to the number of touch operations received in the edge areas concurrently.

The left and right edge areas of the mobile terminal are touch screens (curved screens). In this case, the mobile terminal receives touch operations through the touch screen located on the edge areas; or, the left and right edge areas of the mobile terminal are provided with at least one of a pressure sensor, a thermal sensor, and a capacitive sensor. In this case, the mobile terminal receives a touch operation through the at least one sensor.

When the user uses the right-hand holding mode to hold the mobile terminal, the number of touch operations received concurrently in the left edge area is usually greater than the number of touch operations received concurrently in the right edge area; when the user uses the left-hand holding mode to hold the mobile terminal, the number of touch operations received concurrently in the right edge area is usually greater than the number of touch operations received concurrently in the left edge area. When the user uses both hands to hold the mobile terminal, the number of touch operations received concurrently in the left edge area is usually equal to the number of touch operations received concurrently in the right edge area.

According to the above holding rules, when the number of touch operations received by the mobile terminal in the left edge area is greater than the number of touch operations received in the right edge area, it is determined that the holding mode is right-hand holding; when the number of touch operations received by the mobile terminal in the right edge area is greater than the number of touch operations received in the left edge area, it is determined that the holding mode is left-hand holding; when the number of touch operations received by the mobile terminal in the left edge area is equal to the number of touch operations received in the right edge area, determine that the holding mode is two-hand holding.

The mobile terminal can also determine the holding mode in other ways, which will not be listed one by one herein.

The mobile terminal determines the first operation area and the second operation area according to the holding mode, including: when the holding mode is right-hand holding, determining that the second operation area includes the right-hand edge area, and the area of the right-hand edge area in the second operation area is greater than a first preset value; when the holding mode is left-hand holding, it is determined that the second operation area includes the left-hand edge area, and the area of the left-hand edge area in the second operation area is greater than a second preset value; when the holding mode is two-hand holding, it is determined that the second operation area includes the left-hand edge area and the right-hand edge area, and the area of the left-hand edge area in the second operation area is greater than a third preset value, and the area of the right-hand edge area in the second operation area is greater than a fourth preset value.

The first preset value, the second preset value, the third preset value, and the fourth preset value are all greater than 0. The first preset value, the second preset value, the third preset value, and the fourth preset value may be the same or different. This example does not limit the values of the first preset value, the second preset value, the third preset value, and the fourth preset value.

The first preset value, the second preset value, the third preset value, and the fourth preset value may be user-defined; or, may be set by the mobile terminal by default.

The left-hand edge area refers to the edge area touched by the left palm in the touch screen; the right-hand edge area refers to the edge area touched by the right palm in the touch screen.

The left-hand edge area may be one of a left edge area, a right edge area, an upper edge area, and a lower edge area; the right-hand edge area is an edge area opposite to the left-hand edge area.

When the user applies the right-hand holding to the mobile terminal, the right hand touches the right-hand edge area by mistake in a larger range; when the left-hand holding is applied to the mobile terminal, the left hand touches the left-hand edge area by mistake in a larger range. So when the holding mode is right-hand holding, it is determined that the second operation area includes the right-hand edge area, and the area of the right-hand edge area in the second operation area is greater than the first preset value, thereby reducing the probabilities of responses of the mobile terminal to the accidental operations on the right-hand edge area. Similarly, when the holding mode is left-hand holding, it is determined that the second operation area includes the left-hand edge area, and the area of the left-hand edge area in the second operation area is greater than the second preset value, thereby reducing the probabilities of responses of the mobile terminal to the accidental operations on the left-hand edge area. Similarly, when the holding mode is two-hand holding, it is determined that the second operation area includes the left-hand edge area and the right-hand edge area, and the area of the left-hand edge area in the second operation area is greater than the third preset value, and the area of the right-hand edge area in the second operation area is greater than the fourth preset value, thereby reducing the probabilities of responses of the mobile terminal to the accidental operations on the left-hand edge area, also reducing the probabilities of responses of the mobile terminal to the accidental operations on the right-hand edge area.

Figure 16:
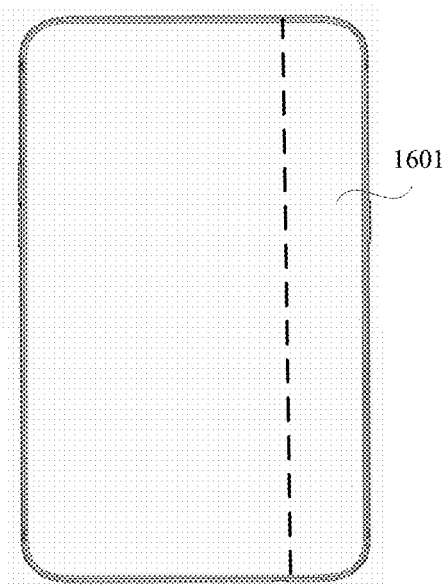
FIG. 16 is a schematic diagram illustrating a second operation area according to one example implementation.

In an example, referring to FIG. 16, the mobile terminal determines that the holding mode is right-hand holding, and the second operation area includes a right-hand edge area 1601, and an area of the right-hand edge area 1601 is larger than the first preset value.

Figure 17:
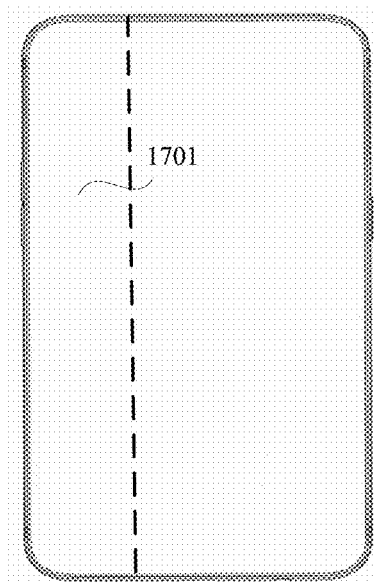
FIG. 17 is a schematic diagram illustrating a second operation area according to one example implementation.

In an example, referring to FIG. 17, the mobile terminal determines that the holding mode is left-hand holding, and the second operation area includes a left-hand edge area 1701, and an area of the left-hand edge area 1701 is larger than the second preset value.

Figure 18:
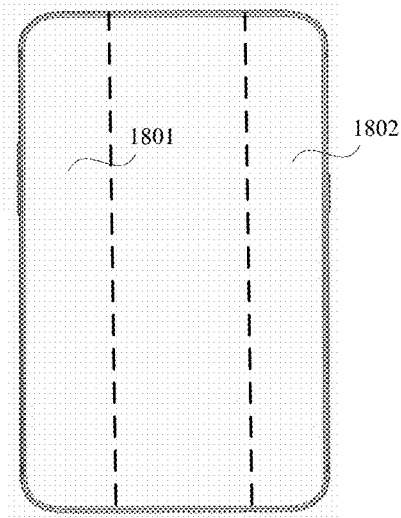
FIG. 18 is a schematic diagram illustrating a second operation area according to one example implementation.

In an example, referring to FIG. 18, the mobile terminal determines that the holding mode is a two-hand holding mode, and the second operation area includes a left-hand edge area 1801 and a right-hand edge area 1802. The area of the left-hand edge area 1801 is larger than the third preset value. The area of the side edge area 1802 is larger than the fourth preset value.

It is noted that, the examples of using the foregoing method for determining the first operation area and the second operation area according to the holding mode are for illustrative purposes only. In actual implementations, the method for determining the first operation area and the second operation area according to the holding mode may be implemented differently. For example: when the holding mode is right-hand holding, it is determined that the second operation area includes the right-hand edge area and the left-hand edge area, and the area of the right-hand edge area is larger than the area of the left-hand edge area; when the holding mode is left-hand holding, it is determined that the second operation area includes the right-hand edge area and the left-hand edge area, and the area of the right-hand edge area is smaller than the area of the left-hand edge area; when the holding mode is two-hand holding, it is determined that the second operation area includes the right-hand edge area and the left-hand edge area, and the area of the right-hand edge area is equal to the area of the left-hand edge area; this example does not limit the manner of determining the first operation area and the second operation area according to the holding mode.

Second manner: determining the display mode of the mobile terminal; determining the first operation area and second operation area according to the display mode.

The mobile terminal determines the display mode, including but not limited to the following ways.

First way: the mobile terminal obtains the instruction information of the display mode, and determines the corresponding display mode according to the instruction information.

The instruction information is represented by a character string. For example, the instruction information "00" indicates a positive vertical screen display; the instruction information "01" indicates an inverted vertical screen display; the instruction information "10" indicates a positive horizontal screen display; the instruction information "11" indicates an inverted horizontal screen display.

Second way: the mobile terminal obtains acceleration information and determines the corresponding display mode based on the acceleration information.

In an example, an acceleration sensor, such as a gravity sensor (G-sensor), is installed in the mobile terminal, and the acceleration sensor is used to collect acceleration information of the mobile terminal. The acceleration information is used to indicate the posture of the mobile terminal. Since the mobile terminal uses a specific display mode to display the display interface, the user will rotate the mobile terminal to the corresponding posture to view the display interface. Therefore, the display mode of the mobile terminal can be determined by obtaining the posture of the mobile terminal.

For example: when the acceleration data is (0, 9.81, 0), the corresponding display mode is the positive vertical screen display; when the acceleration data is (−9.81, 0, 0), the corresponding display mode is the positive horizontal screen display; when the acceleration data is (9.81, 0, 0), the corresponding display mode is the inverted horizontal screen display; when the acceleration data is (0, −9.81, 0), the corresponding display mode is the inverted vertical screen display.

The mobile terminal can also determine the display mode by other methods, which will not be enumerated in this example.

The mobile terminal determines the first operation area and the second operation area according to the display mode, including: when the display mode is a vertical screen display, the second operation area includes the left edge area and the right edge area; when the display mode is a horizontal screen display, the second operation area includes the upper edge area and the lower edge area.

When the display mode of the mobile terminal is the horizontal screen display, the range of touching by mistake is relatively large in the upper edge area and the lower edge area, therefore, when the display mode is the horizontal screen display, it is determined that the second operation area includes the upper edge area and the lower edge area. In this way, the probability of responding to accidental operations on the upper edge area and the lower edge area is reduced. When the display mode is the vertical screen display, it is determined that the second operation area includes the left edge area and the right edge area, so that the probability of responding to accidental operations on the left edge area and the right edge area is reduced.

Figure 19:
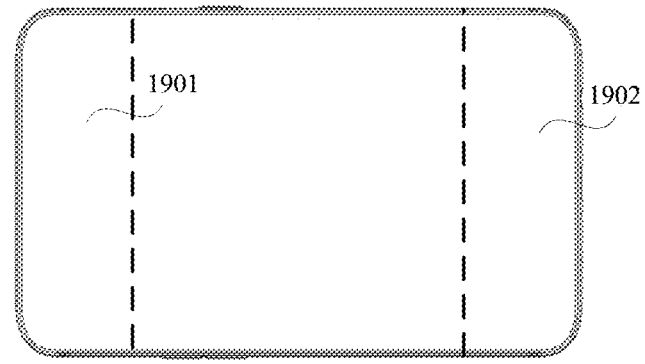
FIG. 19 is a schematic diagram illustrating a second operation area according to one example implementation.

In one example, referring to FIG. 19, the display mode is a horizontal screen display, and the second operation area includes an upper edge area 1901 and a lower edge area 1902.

Figure 20:
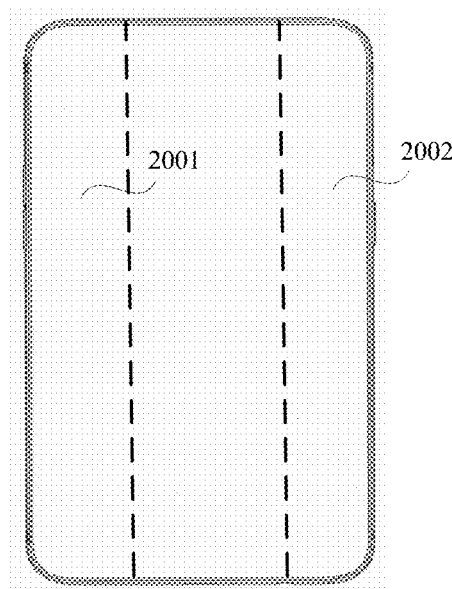
FIG. 20 is a schematic diagram illustrating a second operation area according to one example implementation.

In one example, referring to FIG. 20, the display mode is a vertical screen display, and the second operation area includes a left edge area 2001 and a right edge area 2002.

It is noted that, the examples of using the foregoing method for determining the first operation area and the second operation area according to the display mode are for illustrative purposes only. In actual implementations, the method for determining the first operation area and the second operation area according to the display mode may be implemented differently. For example: when the display mode is the vertical screen display, the second operation area includes the left edge area, right edge area, upper edge area, and lower edge area. The area of the left edge area and the area of the right edge area are larger than the area of the upper edge area. The area of the left edge area and the area of the right edge area are larger than the area of the lower edge area. When the display mode is the horizontal screen display, the second operation area includes the left edge area, right edge area, upper edge area, and lower edge area. The area of the upper edge area and the area of the lower edge area are larger than the area of the left edge area. The area of the upper edge area and the area of the lower edge area are larger than the area of the right edge area. This example does not limit the ways of determining the first operation area and second operation area according to the display mode.

Third manner: determining the implementation scenario of the mobile terminal; determining the first operation area and second operation area according to the implementation scenario.

The implementation scenario of the mobile terminal includes an application(s) currently running on the mobile terminal.

In an example, determining the implementation scenario by the mobile terminal includes: obtaining a package name corresponding to a currently running main activity; and determining a corresponding application according to the package name.

In an example, determining the first operation area and the second operation area according to the implementation scenario includes: responsive to determining that the application currently running on the mobile terminal is a video playback application or a game application, determining that the second operation area includes the upper edge area and the lower edge area; responsive to determining that the application currently running on the mobile terminal is a voice call application, determining that the second operation area includes the left edge area and the right edge area.

When the user uses a video playback application or a game application, the display mode of the mobile terminal is usually a horizontal screen display, and the user holds the mobile terminal in a two-hand holding mode. In this case, the range of touching by mistake is relatively larger in the upper edge area and the lower edge area. Therefore, when the mobile terminal's currently running application is the video playback application or the game applications, by determining that the second operation area includes the upper edge area and the lower edge area, the probability of responding of the mobile terminal to accidental operations in the upper edge area and the lower edge area is reduced.

When the user uses a voice call application, the display mode of the mobile terminal is usually a vertical screen display. In this case, a range of touching by mistake in the left edge area and the right edge area is relatively larger. Therefore, when the current application of the mobile terminal is a voice call application, it is determined that the second operation area includes the left edge area and the right edge area, thereby reducing the probability of the mobile terminal responding to accidental operations on the left edge area and the right edge area.

It is noted that, the examples of using the foregoing method for determining the first operation area and the second operation area according to the implementation scenario are for illustrative purposes only. In actual implementations, the method for determining the first operation area and the second operation area according to the implementation scenario may be implemented differently. For example: determining the first operation area and the second operation area according to other types of applications, this example does not limit the manner of determining the first operation area and the second operation area according to the implementation scenario.

In the present disclosure, the first operation area and the second operation area can be determined according to at least one of the holding mode, the display mode, and the implementation scenario.

At 1502: receiving a first touch operation and a second touch operation which act on the touch screen for a preset time period.

For a detailed description of 1502, refer to 701, which is not described in this example.

At 1503: determining an operation area on which the first touch operation is applied. The operation area on which the first touch operation is applied is one of the first operation area and the second operation area.

For a detailed description of 1503, refer to 702, which is not described in this example.

At 1504: determining an operation area on which the second touch operation is applied. The operation area on which the second touch operation is applied is one of the first operation area and the second operation area.

For a detailed description of 1504, refer to 703, which is not described in this example.

At 1505: determining whether to respond to the first touch operation and/or the second touch operation according to the operation area on which the first touch operation is applied and the operation area on which the second touch operation is applied.

For a detailed description of 1505, refer to 704, which is not described in this example.

According to the method provided in this example, when the mobile terminal receives at least two touch operations, the mobile terminal determines whether to respond to the touch operation according to the operation area on which each touch operation acts, solving the problem of wasting the operating resources of the mobile terminal caused by the mobile terminal upon receiving a touch operation responding directly to the touch operation and the touch operation being an accidental operation. Because the mobile terminal can determine whether to respond to a touch operation based on whether the operation area is an area where accidental operations occur with a high probability, the probability of the mobile terminal responding to accidental operations can be therefore reduced.

In addition, the first operation area and the second operation area are determined in different ways, so that the first operation area and the second operation area can dynamically adapt to the current usage of the mobile terminal, and the flexibility of configuring the first operation area and the second operation area can be improved.

In the above method, when the mobile terminal receives at least two touch operations, it can only determine whether to respond to touch operations on different operation areas. For different touch operations on the same operation area, the mobile terminal cannot determine whether to respond to different touch operations.

In order to ensure that the mobile terminal can determine whether to respond to different touch operations acting on the same operation area, the following examples are also provided in this application.

Figure 21:
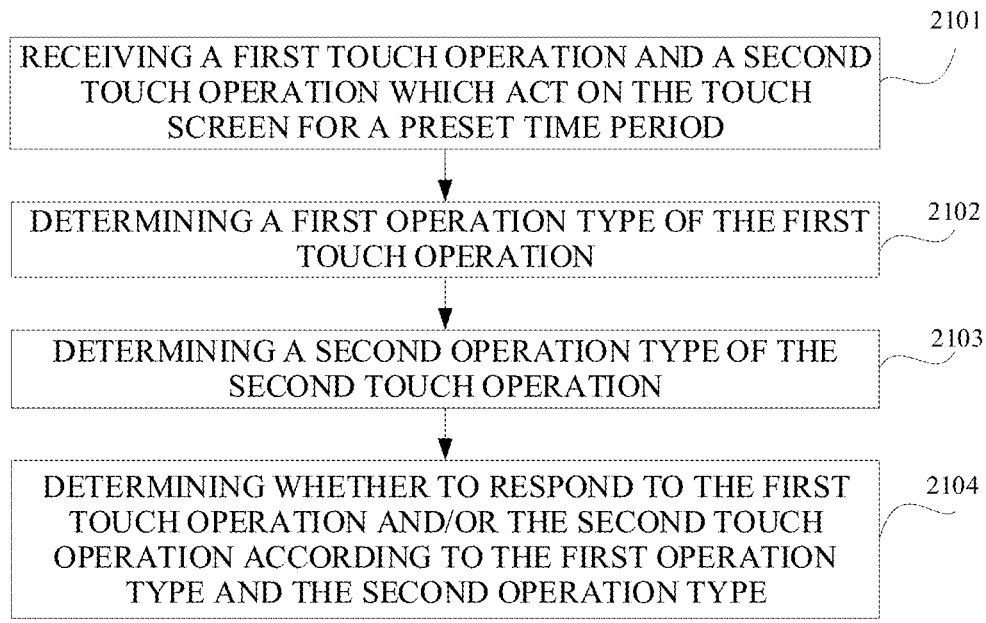
FIG. 21 is a schematic flowchart of a method for responding to a touch operation according to one example implementation.

FIG. 21 provides a flowchart of a method for responding to a touch operation according to an example implementation. The method begins at 2101.

At 2101: receiving a first touch operation and a second touch operation which act on the touch screen for a preset time period.

For a detailed description of 2101, refer to 701, which is not described in this example.

At 2102: determining a first operation type of the first touch operation.

The operation type (including the first operation type and the second operation type) is one of a click type, a slide type, and a long-press type.

The mobile terminal determines the operation type of the touch operation according to the touch duration and/or displacement of the touch operation (including the first touch operation and the second touch operation).

In an example, when the touch duration is less than or equal to a first duration threshold and the displacement does not change, the operation type of the touch operation is determined as a click type; when the touch duration is greater than the first duration threshold, less than or equal to a second duration threshold, and the displacement changes, the touch operation is determined as a sliding operation; when the touch duration is greater than the first duration threshold, less than or equal to a third duration threshold, and the displacement does not change, the touch operation is determined as a long-press operation.

At 2103: determining a second operation type of the second touch operation.

For a detailed description of 2103, refer to 2102, which is not described in this example.

At 2104: determining whether to respond to the first touch operation and/or the second touch operation according to the first operation type and the second operation type.

The response priority of the first operation type is higher than the response priority of the second operation type, and the mobile terminal determines whether to respond to the first touch operation and/or the second touch operation according to the first operation type and the second operation type, including: respond to the first touch operation and does not respond to the second touch operation; or, after responding to the first touch operation, respond to the second touch operation.

The first operation type is a click type, the second operation type is at least one of a slide type and a long-press type; or, the first operation type is a slide type, and the second operation type is a long-press type.

Because in the process of using the mobile terminal, the probability of a touch operation in long-press type being an operation-by-mistake is higher than the probability of a touch operation in slide type being an operation-by-mistake, which is higher than the probability of a touch operation in click type being an operation-by-mistake, therefore, in this example, by only responding or preferentially responding to a touch operation with a lower probability of operations-by-mistake, the probability of the mobile terminal responding to operations-by-mistake can be reduced.

When the first operation type and the second operation type are both long-press types, the probability that both the first touch operation and the second touch operation are operations-by-mistake is high. Therefore, when the first operation type and the second operation type are both long-press types, the first touch operation and the second touch operation are not responded, thereby reducing the probability that the mobile terminal responds to operations-by-mistake.

According to the method provided in this example, when the mobile terminal receives at least two touch operations, determines whether to respond to the corresponding touch operation according to the operation type of each touch operation; solving the problem of wasting the operating resources of the mobile terminal caused by mistaking touch operation when the mobile terminal responds directly to the touch operation as long as the touch operation is received.

Because the mobile terminal can, based on whether the operation type is a type that has a higher probability of being a touch operation by mistake, determine whether to respond to a touch operation, the probability of the mobile terminal responding to operations-by-mistake can be reduced.

Referring to FIG. 21, the response priority of the operation type fixed as the response priority of the click type is higher than the response priority of the slide type, which is higher than the response priority of the long-press type. However, in some implementation scenarios, the response priority of the operation type will be different. For example, in a chat interface scenario, the probability of a touch operation in slide type being operations by mistake is higher than the probability of a touch operation in long-press type being operations by mistake, which is higher than the probability of a touch operation in click type being operations by mistake. At this time, the response priority of the click type is higher than the response priority of the long-press type, which is higher than the response priority of the slide type. Therefore, in order to reduce the probability of the response of the mobile terminal to operations-by-mistake, the following examples are also provided in the present disclosure.

Figure 22:
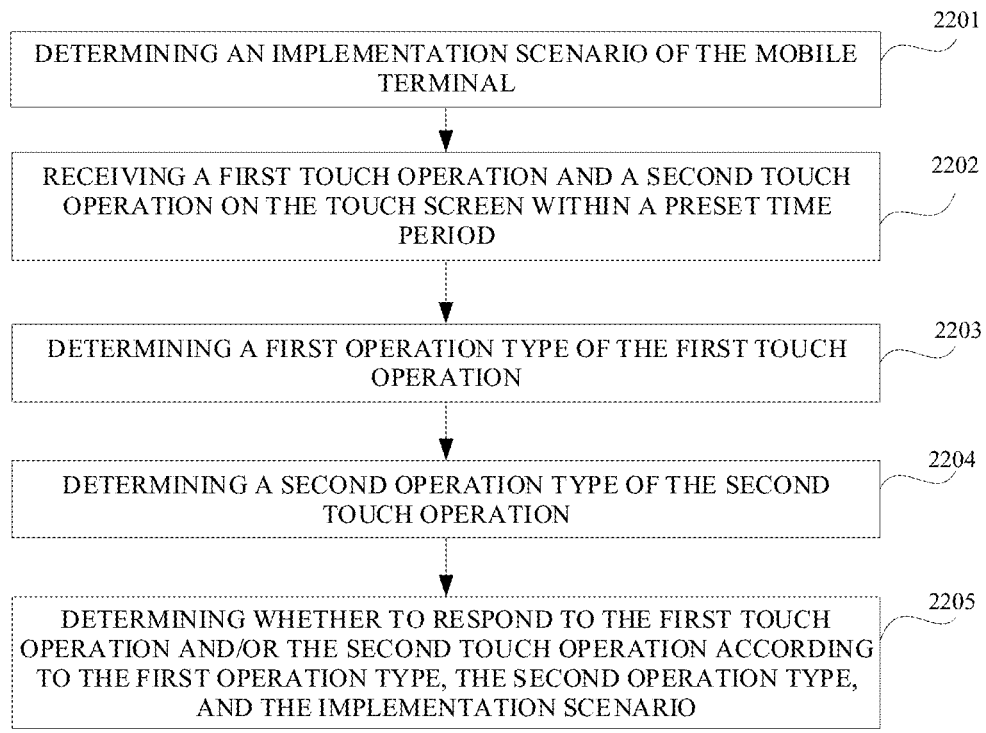
FIG. 22 is a schematic flowchart of a method for responding to a touch operation according to one example implementation.

FIG. 22 is a flowchart of a method for responding to a touch operation according to another example implementation. The method begins at 2201.

At 2201: determining an implementation scenario of the mobile terminal.

For a detailed description of 2201, refer to 1501, which is not described in this example.

At 2202: receiving a first touch operation and a second touch operation on the touch screen within a preset time period.

For a detailed description of 2202, refer to 701, which is not described in this example.

At 2203: determining a first operation type of the first touch operation.

For a detailed description of 2203, refer to 2102, which is not described in this example.

At 2204: determining a second operation type of the second touch operation.

For a detailed description of 2204, refer to 2102, which is not described in this example.

At 2205: determining whether to respond to the first touch operation and/or the second touch operation according to the first operation type, the second operation type, and the implementation scenario.

The mobile terminal determines the response priority of the first operation type and the response priority of the second operation type according to the implementation scenario; determines whether to respond to the first touch operation and/or the second touch operation according to the response priority of the first operation type and the response priority of the second operation type.

The implementation scenario is a first preset scenario, and it is determined that the response priority of the click type is higher than the response priority of the slide type, which is higher than the response priority of the long-press type; or, the implementation scenario is a second preset scenario, and it is determined that the response priority of the click type is higher than the response priority of the long-press type, which is higher than the response priority of the slide type; or, the implementation scenario is a third preset scenario, and it is determined that the response priority of the slide type is higher than the response priority of the click type, which is higher than the response priority of the long-press type.

The first preset scenario includes at least one program type, at least one application program, and/or at least one display interface. For example, the first preset scenario includes a main interface and a shopping application.

The second preset scenario includes at least one program type, at least one application program, and/or at least one display interface. For example, the second preset scenario includes a chat interface.

The third preset scenario includes at least one program type, at least one application program, and/or at least one display interface. For example, the third preset scenario includes a game interface.

The description of determining whether to respond to the first touch operation and/or the second touch operation according to the response priority of the first operation type and the response priority of the second operation type is described in details in 2104, which is not described in detail in this example.

According to the method, when the mobile terminal receives at least two touch operations, it determines whether to respond to the corresponding touch operation according to the operation type of each touch operation, solving the problem of wasting the operating resources of the mobile terminal caused by mistaking touch operation when the mobile terminal responds directly to the touch operation as long as the touch operation is received. Because the mobile terminal can, based on whether the operation type is a type that has a higher probability of being a touch operation by mistake, determine whether to respond to the touch operation, the probability of the mobile terminal responding to operations-by-mistake can be reduced.

In addition, by determining the response priority of the operation type according to the implementation scenario, the mobile terminal can flexibly switch the response priority of the operation type according to different implementation scenarios, thereby reducing the probability that the mobile terminal responds to operations-by-mistake.

In order to improve the accuracy of the mobile terminal's response to the touch operation, in the present disclosure, the mobile terminal combines the aspect of the operation area of the touch operation and the aspect of the operation type of the touch operation to determine whether to respond to the touch operation. The following examples are also provided in the present disclosure.

Figure 23:
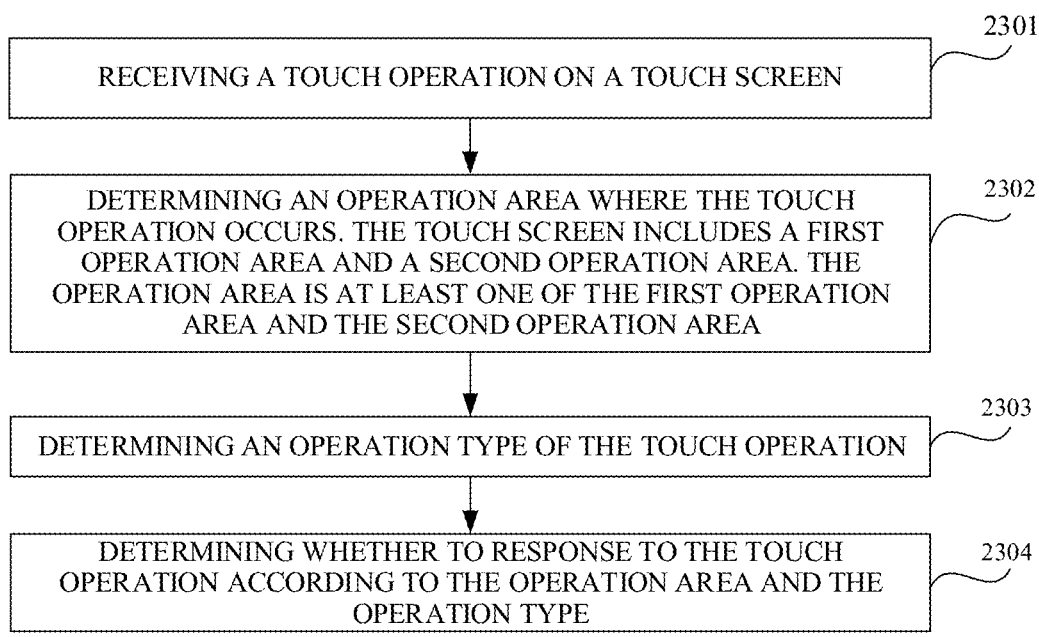
FIG. 23 is a schematic flowchart of a method for responding to a touch operation according to one example implementation.

FIG. 23 is a flowchart of a method for responding to a touch operation according to another example implementation. The method begins at 2301.

At 2301: receiving a touch operation on a touch screen.

The mobile terminal receives one touch operation or at least two touch operation on the touch screen. For a detailed description of 2301, refer to 701, which is not described in this implementation.

At 2302: determining an operation area where the touch operation occurs. The touch screen includes a first operation area and a second operation area. The operation area is at least one of the first operation area and the second operation area.

For a detailed description of 2302, refer to 702, which is not described in this implementation.

At 2303: determining an operation type of the touch operation.

For a detailed description of 2303, refer to 2102, which is not described in this implementation.

At 2304: determining whether to response to the touch operation according to the operation area and the operation type.

The response priority of the touch operation acting on the first operation area is higher than the response priority of the touch operation acting on the second operation area. The operation types include a click type, a slide type, and a long-press type.

In the first scenario, the touch operation on the touch screen is one touch operation. At this time, when the operation area of the touch operation is the first operation area, the touch operation is responded to. Since the probability of operations occurring on the first operation area being accidental operations is low, the probability of the response of the mobile terminal to accidental operations is relatively lower.

When the operation area is the second operation area and the operation type is the click type or the slide type, the touch operation is responded to; when the operation area is the second operation area and the operation type is the long-press type, the touch operation is not responded to.

Because the probability of the touch operation of the long-press type being accidental operation is relatively high, and the probability of touch operation on the second operation area being accidental operation is relatively high, therefore, when the operation area is the second operation area, and the operation type is the long-press type, the touch operation is not responded to, thereby reducing the probability that the mobile terminal responds to accidental operations.

In the second scenario, the touch operations on the touch screen are at least two touch operations. At this time, in 2301, the mobile terminal receives a first touch operation and a second touch operation which act on the touch screen; in 2302, the mobile terminal determines an operation area where the first touch operation occurs; determines an operation area where the second touch operation occurs; in 2303, the mobile terminal determines a first operation type of the first touch operation; determines a second operation type of the second touch operation.

Response rules are stored in the mobile terminal, and the response rules are used to indicate whether to respond to a touch operation in a specific operation area and having a specific operation type. Referring to the response rules illustrated in FIG. 24, according to the response rules, when the mobile terminal receives both the first touch operation and the second touch operation, if the operation type of the first touch operation is the same as the operation type of the second touch operation, or if the operation type of the first touch operation is click type or slide type, then the mobile terminal responds preferentially to the first touch operation. If the operation type of the first touch operation is different from the operation type of the second touch operation, and the operation type of the first touch operation is long-press type, then the mobile terminal preferentially responds to the second touch operation. When the mobile terminal receives only the first touch operation, it responds to the first touch operation. When the mobile terminal receives only the second touch operation, and the operation type of the second touch operation is click type or slide type, it responds to the second touch operation; when the mobile terminal receives only the second touch operation, and the operation type of the second touch operation is long-press type, it does not respond to the second touch operation.

In an example, a response priority corresponding to the operation area and a response priority corresponding to the operation type are pre-stored in the mobile terminal. At this time, when the operation area where the first touch operation occurs is the first operation area, the operation area where the second touch operation occurs is the second operation area, and a response priority of the second operation type is higher than a response priority of the first operation type, i.e., the response priority corresponding to the operation area is opposite to the response priority corresponding to the operation type, the mobile terminal determines a priority level of the operation area and a priority level of the operation type; determines whether to respond to the first touch operation and/or the second touch operation according to the priority level.

The priority level is indicative of responding to the touch operation according to the response priority corresponding to the operation area; or the priority level is indicative of responding to the touch operation according to the response priority corresponding to the operation type.

In at least one implementation, a response priority of the click type is higher than a response priority of the slide type, which is higher than a response priority of the long-press type.

In at least one implementation, when the first operation type is the click type or the slide type, it is determined that the priority level of the operation area is higher than the priority level of the operation type. At this time, the mobile terminal responds to the first touch operation and/or the second touch operation according to the response priority corresponding to the operation area.

For example, the first operation type is the slide type and the second operation type is the click type. At this time, the response priority of the first touch operation on the first operation area is higher than the response priority of the second touch operation on the second operation area. The response priority of the first touch operation with the first operation type is lower than the response priority of the second touch operation with the second operation type. The mobile terminal determines that the priority level of the operation area is higher than the priority level of the operation type, i.e., according to the response priority corresponding to the operation area, the mobile terminal first responds to the first touch operation and then responds to the second touch operation; or only responds to the first touch operation.

In at least one implementation, when the first operation type is the long-press type, it is determined that the priority level of the operation type is higher than the priority level of the operation area.

For example: the first operation type is the long-press type and the second operation type is the click type. At this time, the response priority of the first touch operation on the first operation area is higher than the response priority of the second touch operation on the second operation area; the response priority of the first touch operation with the first operation type is lower than the response priority of the second touch operation with the second operation type. The mobile terminal determines that the priority level of the operation area is lower than the priority level of the operation type, i.e., the mobile terminal responds preferentially to the second touch operation and then to the first touch operation according to the response priority corresponding to the operation type; or, only responds to the second touch operation.

In summary, the method provided in this implementation determines whether to respond to the touch operation according to the operation type of the touch operation and the operation area on which the touch operation acts, solving the problem of wasting the operating resources of the mobile terminal caused by mistaking touch operation when the mobile terminal responds directly to the touch operation as long as the touch operation is received. The mobile terminal can combine an aspect of whether the operation area is an area with a high probability of having accidental touch operations, and an aspect of whether the operation type is a type with a high probability of having accidental touch operations, to determine whether to respond to the touch operation, thereby reducing the probability of the mobile terminal responding to accidental operations.

When the mobile terminal receives at least three touch operations at the same time, for any two of the at least three touch operations, the above process is not repeated until it is determined which touch operation to respond to.

The first operation area and the second operation area on the touch screen may be set by default when the mobile terminal leaves the factory; or may be determined according to a user's holding mode of the mobile terminal and/or posture information of the mobile terminal. In this example, the first operation area and the second operation area are determined according to the holding mode of the mobile terminal and/or the display mode of the mobile terminal and/or the implementation scenario of the mobile terminal.

Figure 25:
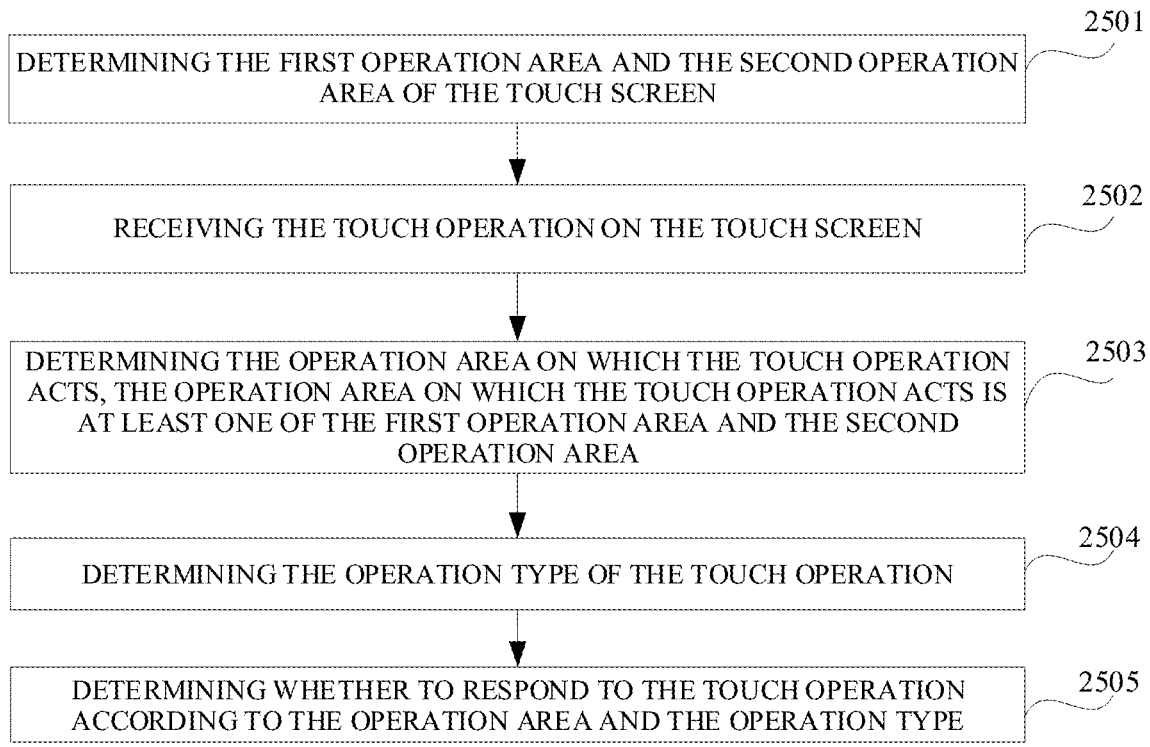
FIG. 25 is a schematic flowchart of a method for responding to a touch operation according to one example implementation.

FIG. 25 is a flowchart of a method for responding to a touch operation according to another example implementation. The method begins at 2501.

At 2501: determining the first operation area and the second operation area of the touch screen.

For a detailed description of 2501, refer to 1501, which is not described in this example.

At 2502: receiving the touch operation on the touch screen.

For a detailed description of 2502, refer to 2301, which is not described in this example.

At 2503: determining the operation area on which the touch operation acts, the operation area on which the touch operation acts is at least one of the first operation area and the second operation area.

For a detailed description of 2503, refer to 2302, which is not described in this example.

At 2504: determining the operation type of the touch operation.

For a detailed description of 2504, refer to 2303, which is not described in this example.

At 2505: determining whether to respond to the touch operation according to the operation area and the operation type.

For a detailed description of 2505, refer to 2304, which is not described in this example.

In summary, the method provided in this example can determine the first operation area and the second operation area in different ways, so that the first operation area and the second operation area can dynamically adapt to the current usage situation of the mobile terminal, thereby improving the flexibility of configuring the first operation area and second operation area.

The following are device implementations of the present disclosure, which can be used to implement the method implementations of the present disclosure. For details not disclosed in the device implementations of the present disclosure, please refer to the method implementations of the present disclosure.

Figure 26:
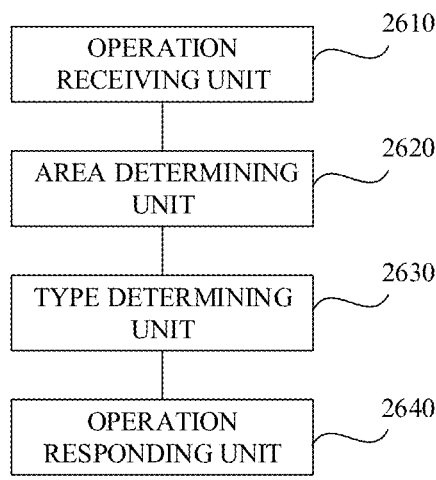
FIG. 26 is a schematic block diagram of a device for responding to a touch operation according to one example implementation.

Referring to FIG. 26, which shows a structural block diagram of a device for responding to a touch operation according to an implementation. The device may be implemented as part or all of a mobile terminal through software, hardware, or a combination of both. The device is suitable for the mobile terminal. The mobile terminal includes a touch screen. The device may include an operation receiving unit 2610, an area determining unit 2620, a type determining unit 2630, and an operation responding unit 2640.

The operation receiving unit 2610 is configured to receive the touch operation on the touch screen. The area determining unit 2620 is configured to determine an operation area where the touch operation occurs, where the touch screen includes a first operation area and a second operation area, and the operation area is at least one of the first operation area and the second operation area. The type determining unit 2630 is configured to determine an operation type of the touch operation. The operation responding unit 2640 is configured to determine whether to respond to the touch operation according to the operation area and the operation type.

In at least one implementation, a touch operation on the first operation area has a response priority higher than a touch operation on the second operation area, and the operation type includes a click type, a slide type, and a long-press type.

In at least one implementation, the operation responding unit 2640 is configured to: respond to the touch operation when the operation area is the first operation area; respond to the touch operation when the operation area is the second operation area and the operation type is the click type or the slide type; and skip responding to the touch operation when the operation area is the second operation area and the operation type is the long-press type.

In at least one implementation, the operation receiving unit 2610 is configured to receive a first touch operation and a second touch operation which act on the touch screen for a preset time period. The area determining unit 2620 is configured to: determine an operation area where the first touch operation occurs; and determine an operation area where the second touch operation occurs. The type determining unit 2630 is configured to: determine a first operation type of the first touch operation; and determine a second operation type of the second touch operation. The operation responding unit 2640 is configured to: determine to respond to the first touch operation according to the first operation area, the second operation area, the first operation type, and the second operation type when the first operation type is the same as the second operation type, the operation area where the first touch operation occurs is the first touch operation, and the operation area where the second touch operation occurs is the second touch operation.

In at least one implementation, the first operation type is different from the second operation type and the second operation type has a response priority higher than the first operation type. The operation responding unit 2640 is configured to: determine a priority level of the operation area and a priority level of the operation type, where the priority level is indicative of responding to the touch operation according to a response priority corresponding to the operation area or according to a response priority corresponding to the operation type; and determine whether to respond to at least one of the first touch operation and the second touch operation according to the priority level.

In at least one implementation, the first operation type is one of the click type, the slide type, and the long-press type, the second operation type is one of the click type, the slide type, and the long-press type, and a response priority of the click type is higher than a response priority of the slide type and the response priority of the slide type is higher than a response priority of the long-press type. The operation responding unit 2640 is configured to: determine that the priority level of the operation area is higher than the priority level of the operation type when the first operation type is the click type or the slide type; and determine that the priority level of the operation type is higher than the priority level of the operation area when the first operation type is the long-press type.

The implementations of the present disclosure further provide a non-transitory computer readable storage medium. The non-transitory computer readable storage medium is configured to store a computer program which, when executed by a processor, causes the processor to execute the foregoing method implementations.

Another aspect of the present disclosure also provides a computer program product containing program instructions, which when run on a computer, causes the computer to perform the methods described in the above aspects.

A person of ordinary skill in the art can understand that all or part of the operations of implementing the foregoing implementations or examples can be implemented by hardware, and can also be implemented by a program instructing related hardware. The program can be stored in a computer-readable storage medium, and the storage medium mentioned above can be a read-only memory, a magnetic disk, or an optical disk.

The foregoing implementations are merely specific implementations of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method for responding to a touch operation on a mobile terminal, the mobile terminal comprising a touch screen, and the method comprising:

receiving a first touch operation and a second touch operation that act on the touch screen for a preset time period;

determining a first operation area where the first touch operation occurs and a second operation area where the second touch operation occurs;

determining a first operation type of the first touch operation and a second operation type of the second touch operation, wherein the first operation type and the second operation type comprises at least one of a click type, a slide type, or a long-press type;

when the first operation type is the same as the second operation type, determining whether to respond to the first touch operation according to the first operation area, the second operation area, the first operation type, and the second operation type; and when the first operation type is different from the second operation type and the second operation type has a response priority higher than the first operation type, determining a priority level of an operation area and a priority level of an operation type, and determining whether to respond to at least one of the first touch operation or the second touch operation according to the priority level of the operation area and the priority level of the operation type, wherein a priority level is indicative of responding to the touch operation according to a response priority corresponding to the operation area or according to a response priority corresponding to the operation type, wherein a response priority of the click type is higher than a response priority of the slide type and the response priority of the slide type is higher than a response priority of the long-press type; and determining the priority level of the operation area and the priority level of the operation type comprises:

determining that the priority level of the operation area is higher than the priority level of the operation type when the first operation type is the click type or the slide type; and determining that the priority level of the operation type is higher than the priority level of the operation area when the first operation type is the long-press type.

2. The method of claim 1, wherein determining whether to respond to at least one of the first touch operation or the second touch operation according to the priority level of the operation area and the priority level of the operation type comprises:

responding to the second touch operation when the second operation type is the click type or the slide type; and skipping responding to the second touch operation when the second operation type is the long-press type.

3. The method of claim 1, wherein determining the first operation area where the first touch operation occurs and the second operation area where the second touch operation occurs comprises:

determining that the operation area where the first touch operation occurs is the first operation area, when a touch position of the first touch operation belongs to a position range corresponding to the first operation area; and determining that the operation area where the second touch operation occurs is the second operation area, when the touch position of the second touch operation does not belong to the position range corresponding to the first operation area.

4. The method of claim 1, wherein the first operation area is an area other than the second operation area in the touch screen.

5. A mobile terminal, comprising:

a touch screen;

at least one processor; and a non-transitory computer readable storage, coupled to the at least one processor and storing at least one computer executable instruction thereon which, when executed by the at least one processor, causes the at least one processor to:

receive a first touch operation and a second touch operation that act on the touch screen for a preset time period;

determine a first operation area where the first touch operation occurs and a second operation area where the second touch operation occurs;

determine a first operation type of the first touch operation and a second operation type of the second touch operation, wherein the first operation type and the second operation type comprise at least one of a click type, a slide type, or a long-press type;

when the first operation type is the same as the second operation type, determine whether to respond to the first touch operation according to the first touch operation area, the second touch operation area, the first operation type, and the second operation type; and when the first operation type is different from the second operation type and the second operation type has a response priority higher than the first operation type, determine a priority level of an operation area and a priority level of an operation type, and determine whether to respond to at least one of the first touch operation or the second touch operation according to the priority level of the operation area and the priority level of the operation type, wherein a priority level is indicative of responding to a touch operation according to a response priority corresponding to the operation area or according to a response priority corresponding to the operation type;

wherein a response priority of the click type is higher than a response priority of the slide type and the response priority of the slide type is higher than a response priority of the long-press type; and the at least one processor configured to determine the priority level of the operation area and the priority level of the operation type is configured to:

determine that the priority level of the operation area is higher than the priority level of the operation type when the first operation type is the click type or the slide type; and determine that the priority level of the operation type is higher than the priority level of the operation area when the first operation type is the long-press type.

6. The mobile terminal of claim 5, wherein the at least one processor configured to determine whether to respond to the first touch operation or the second touch operation according to the priority levels is configured to:

respond to the first touch operation when the first operation type is the click type or the slide type; and skip responding to the second touch operation when the second operation type is the long-press type.

7. The mobile terminal of claim 5, wherein the at least one processor configured to determine the first operation area where the first touch operation occurs and the second operation area where the second touch operation occurs is configured to:

determine that the operation area where the first touch operation occurs is the first operation area, when a touch position of the first touch operation belongs to a position range corresponding to the first operation area; and determine that the operation area where the second touch operation occurs is the second operation area, when the touch position of the second touch operation does not belong to the position range corresponding to the first operation area.

8. The mobile terminal of claim 5, wherein the first operation area is an area other than the second operation area in the touch screen.

9. A non-transitory computer readable storage medium storing a computer program which, when executed by a processor, causes the processor to:

receive a first touch operation and a second touch operation that act on a touch screen of a mobile terminal for a preset time period;

determine a first operation area where the first touch operation occurs and a second operation where the second touch operation occurs;

determine a first operation type of the first touch operation and a second operation type of the second touch operation, wherein the first operation type and the second operation type comprise at least one of a click type, a slide type, or a long-press type;

when the first operation type is the same as the second operation type, determining whether to respond to the first touch operation according to the first operation area, the second operation area, the first operation type, and the second operation type; and when the first operation type is different from the second operation type and the second operation type has a response priority higher than the first operation type, determine a priority level of an operation area and a priority level of an operation type, and determine whether to respond to at least one of the first touch operation or the second touch operation according to the priority level of the operation area and the priority level of the operation type, wherein a priority level is indicative of responding to the touch operation according to the response priority corresponding to the operation area or according to a response priority corresponding to the operation type;

wherein a response priority of the click type is higher than a response priority of the slide type and the response priority of the slide type is higher than a response priority of the long-press type; and the computer program executed by the processor to determine the priority level of the operation area and the priority level of the operation type is executed by the processor to:

determine that the priority level of the operation area is higher than the priority level of the operation type when the first operation type is the click type or the slide type; and determine that the priority level of the operation type is higher than the priority level of the operation area when the first operation type is the long-press type.

10. The non-transitory computer readable storage medium of claim 9, wherein the computer program executed by the processor to determine whether to respond to the first touch operation or the second touch operation according to the priority levels is executed by the processor to:

respond to the second touch operation when the second operation type is the click type or the slide type; and skip responding to the second touch operation when the second operation type is the long-press type.

* * * * *